US011489365B2

(12) United States Patent
Fan et al.

(10) Patent No.: US 11,489,365 B2
(45) Date of Patent: Nov. 1, 2022

(54) NON-THREE-PHASE FAULT ISOLATION AND RESTORATION SYSTEMS

(71) Applicant: Southern States, LLC, Hampton, GA (US)

(72) Inventors: Jiyuan Fan, Hampton, GA (US); Hua Fan, Hampton, GA (US); Joseph R Rostron, Hampton, GA (US)

(73) Assignee: Southern States LLC, Hampton, GA (US)

( * ) Notice: Subject to any disclaimer, the term of this patent is extended or adjusted under 35 U.S.C. 154(b) by 223 days.

(21) Appl. No.: 17/071,681

(22) Filed: Oct. 15, 2020

(65) Prior Publication Data

US 2022/0123589 A1  Apr. 21, 2022

(51) Int. Cl.
*H02J 3/00* (2006.01)
*H02J 13/00* (2006.01)
*H01H 9/16* (2006.01)
*H02H 3/04* (2006.01)

(52) U.S. Cl.
CPC ......... *H02J 13/0004* (2020.01); *H01H 9/167* (2013.01); *H02H 3/042* (2013.01); *H02J 3/00125* (2020.01)

(58) Field of Classification Search
CPC .. H02J 3/00125; H02J 13/0004; H02H 3/042; H01H 9/167
See application file for complete search history.

(56) References Cited

U.S. PATENT DOCUMENTS

| 8,659,862 B2 | 2/2014 | Rostron |
| 8,717,721 B2 | 5/2014 | Rostron |
| 8,861,155 B2 | 10/2014 | Rostron |
| 8,866,487 B2 | 10/2014 | Rostron et al. |
| 9,823,637 B2 | 11/2017 | Rostron et al. |
| 2011/0270454 A1 | 11/2011 | Kreiss et al. |
| 2012/0265360 A1* | 10/2012 | Smit ............... H02H 7/262 700/293 |
| 2013/0054042 A1 | 2/2013 | Du Toit et al. |
| 2015/0002186 A1 | 1/2015 | Taft |
| 2017/0192047 A1 | 7/2017 | Qi et al. |

(Continued)

*Primary Examiner* — Harry R Behm
(74) *Attorney, Agent, or Firm* — Mehrman Law Office; Michael J. Mehrman

(57) ABSTRACT

A smart switch allows distributed generators to "ride through" non-three-phase faults by very quickly detecting a non-three-phase phase fault, locating the fault, identifying the "responsive sectionalizer switches" that will be involved in clearing or isolating the fault, and selecting one of the responsive sectionalizer switches to direct back-feed tie switch operations. The responsive sectionalizer switches trip only the faulted phase(s), and the selected sectionalizer switch instructs a back-feed tie switch to close to back-feed the distributed generators prior to conducting the typical fault response operation. This typically occurs within about three cycles, and is completed before the normal fault clearing and isolation procedures, which momentarily disconnect all three phases to the distributed generators from the normally connected feeder breaker. The looped connection to an alternate feeder breaker during these operations allows the distributed generators to "ride through" the normal fault clearing and isolation procedures.

20 Claims, 16 Drawing Sheets

(56) References Cited

U.S. PATENT DOCUMENTS

| | | |
|---|---|---|
| 2019/0277904 A1 | 9/2019 | Fan et al. |
| 2019/0280476 A1 | 9/2019 | Fan |
| 2020/0195007 A1* | 6/2020 | Sun .................... H04L 45/02 |
| 2021/0036508 A1* | 2/2021 | Quinlan .............. H02H 7/262 |
| 2021/0102986 A1* | 4/2021 | Keller ................. H02H 7/28 |

* cited by examiner

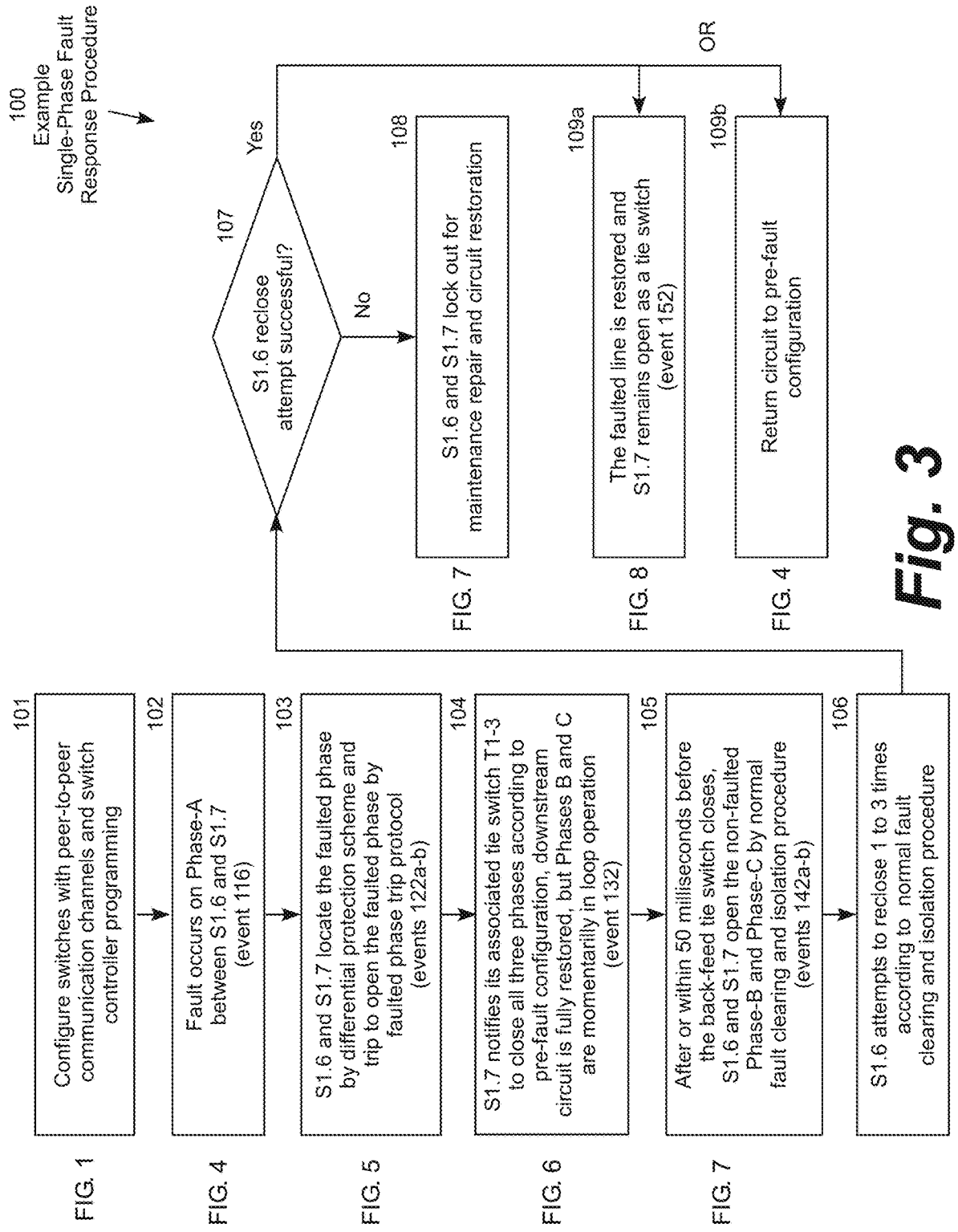

NON-THREE-PHASE FAULT ISOLATION AND RESTORATION SYSTEMS

REFERENCE TO RELATED APPLICATION

This application references commonly owned U.S. Pat. Nos. 8,659,862, 8,861,155, 8,866,487 and 9,823,637; and U.S. Publication Nos. 20190277904 and 20190280476; which are incorporated by reference.

TECHNICAL FIELD

The present invention is directed to electric power systems and, more particularly, to electric power fault detection, isolation and restoration systems that avoid dropping distributed generators during non-three-phase fault responses.

BACKGROUND

Fault detection, isolation and service restoration (also referred to more compactly as "fault isolation" or "sectionalizing") is one of the most important tasks in electric power operations. Using automation to improve the reliability and operation of the transmission and distribution electric power grid is a top industry focus known as the "smart grid." Developing fast and reliable fault isolation systems that minimize the number of customers affected by power outages, and the duration of those outages, is one of the most important tasks in electric power automation and management. Conventional approaches for sectionalizing power circuits were designed for large, central-station power generation plants interconnected by a network of generally passive transmission and distribution lines to deliver the power downstream from the generating plants to the loads. The control schemes designed for this central-station paradigm are becoming increasingly unsatisfactory as electric transmission and distribution networks become increasingly active due to increasing penetration of distributed or load-side power generation resources, such as solar panels, wind turbines, fuel cells, diesel generators, gasoline generators and the like, located downstream from the feeder breakers at the distribution substations connecting the electric power grid to the distribution power lines that serve the distributed generators.

When power outages occur, time is of the essence because electricity is essential to modern life and public safety. Utilities are often penalized based on the duration of an outage and the number of customers affected. To help minimize power outages caused by line faults, sectionalizing switches (also called "reclosers") are used to isolate the faults and tie switches are used to "back-feed" the non-faulted portions of the affected power lines to minimize the number of customers affected by the outages. But conventional sectionalizing techniques designed for passive transmission and distribution systems are not designed to take full advantage of the back-feed opportunities presented by tie switches and distributed generation resources. Load-side generation can also present additional safety hazards by unexpectedly energizing faulted or disconnected line segments from the downstream side.

While conventional transmission and distribution substations typically have utility-grade Supervisory Control and Data Acquisition (SCADA) communication systems allowing for remote monitoring and control of substation equipment, substations are quite expensive and require significant land and time consuming installation. Many transmission tap points located out on power lines away from the substations rely on non-reclosing circuit breakers and have no communication or remote control equipment. This can result in extremely long outage restoration delays, and associated customer outage times, as technicians have to physically travel to the tap points to reclose the breakers. Manual power restoration often relies on "hunt and peck" procedures as technicians try to locate faults on many miles of power lines with multiple tap points between sub stations.

Conventional distribution systems use automatic reclosers known as sectionalizers to isolate faults. The vast majority of these are located on power lines away from the SCADA-controlled substations. After initially tripping, most conventional reclosers automatically attempt to reclose one to five times over a period of several seconds based on pre-set timing to give the fault a chance to clear without further action. A fault can clear by itself, for example, when a lightening strike is over or when a tree branch falls away after momentarily causing a line fault. If the fault persists after one to five reclosing attempts, the recloser typically locks open requiring a manual reset once the fault has been cleared.

Distribution feeders are generally configured to operate in a radial structure by setting a selected recloser that connects lines to two substations to be a normally-open tie switch. The tie switch is set to normally-open to avoid creating a connectivity loop between the substations in normal operation, but automatically closes to back-feed a portion of the circuit when it detects an outage condition. Although the selection of the tie switch may be dynamic, a particular set of reclosers are usually designated to be the tie switches for normal circuit conditions. A normally-open tie switch may automatically close when it detects that power is lost on only one side of the tie switch to provide a "back-feed" path to the line section that has lost power. It may also be closed manually or by a remote command. Once closed, the tie switch typically operates like a normally-closed sectionalizer.

More advanced fault isolation techniques typically involve detecting the distance and direction to an electric fault. Conventional "distance relays" estimate the distance to a power line fault by determining the line impedance after the fault occurs. However, conventional distance relays do not work well for faults on transmission lines with tap connections because the existence the tapped-off lateral lines affects the line impedance calculation and interfere with the distance estimation. Some transmission lines have upwards of nine taps, which can make it difficult to locate a fault and then sectionalize and reenergize quickly.

In distribution circuits, conventional automated fault isolation techniques can cause unnecessary open and close operations of the sectionalizers when isolating faults, which exposes the power lines to repeated transient disturbances including fault currents, voltage drops, and power outages. This causes unnecessary mechanical wear-and-tear on the switches, as well as multiple transient disturbances on customer equipment, which can knock customer equipment offline and damage electronics. Electric service reliability is generally perceived to decrease as the number of these incidents increases.

Communication systems have been added to transmission and distribution switches located away from substations to enhance fault isolation techniques. For example, certain tap units, tie switches and sectionalizers may include SCADA radios that communicate with the central control station. When a fault occurs on a line segment between two switches, the feeder breaker at the substation typically trips to clear the fault, while fault detection devices at each switch along the fault current path reports a fault flag to the central controller for manual or automatic fault isolation and service restoration. The feeder breakers are typically configured to automatically attempt to reclose one to five times trying to restore the service quickly if the fault is not permanent. This type of solution typically relies on utility-grade SCADA communication and centralized control systems, which are quite complex and costly. The effectiveness of any fault isolation technique is ultimately measured by the speed, reliability, and effectiveness of the fault isolation response. In general, these SCADA approaches are much better than manual "hunt and peck" fault isolation techniques but still involve relatively long procedures, up to tens of minutes in some practical operations.

Automated solutions using switch-level communications and decentralized control have also been developed. The IntelliTeam® system sold by S&C Electric Company is a representative example. This type of solution organizes groups of adjacent switches as independent teams that detect faults through multi-party communications among the team members to determine whether the fault has occurred within the team. When this occurs, all members of the team typically trip without reclosing to initially isolate the fault. When the feeder breaker re-energizes the faulted line section, the deenergized team switches located downstream automatically reclose in cascade as one side of each switch is energized one after another. This approach usually results in an unnecessarily large number switching events and may leave switches unnecessarily open at the end of the restoration process. The sectionalizing process is further complicated by tie switches and distributed generation resources that can be used to back-feed line sections as the fault is isolated. This may result in multiple reclosing sequences in which a single error in the switching sequencing or the multi-party communications during the restoration process can leave the feeder incompletely restored with many switches unnecessarily left open.

Communication-based fault isolation techniques face another challenge because the communication equipment used for fault isolation is needed most at the precise times when the electric power system experiences outages. The loss of electric power therefore interrupts the operation of the grid-powered communication components just when they are needed most. In addition, the communication systems are also vulnerable to severe weather conditions in which the electric power grid faults have more chance to occur. While battery-powered radios may continue to operate during a power outage, the batteries require monitoring and occasional replacement. The U.S. electrical grid includes over five million miles of electric power distribution lines with several million switch points operating at a range of voltages. Many of these switches are in remote locations and the vast majority are located on low-voltage distribution lines that are costly to patrol. Installing a communication system among the switch points or between a central controller and the switch points is an important cost factor in electric power systems, typically costing in the range of $500,000 for "carrier" systems or $30,000 per mile for fiber communications. Installing and maintaining battery-powered radios can be cost prohibitive for many of these switch points. Other types of communication systems are unreliable, often unavailable up to 50% of the time when they are needed. Dedicated hard-wire phone lines are a thing of the past.

U.S. Publication Nos. 2019-0277904 and 2019-0280476, which are incorporated by reference, describe automatic power line fault detection, isolation and back-feed power restoration techniques using distance zone detection and switch timing algorithms. While these smart-grid systems automate fault detection, isolation and back-feed power restoration without relying on centralized SCADA control or peer-to-peer communications between the switches, they exhibit a drawback in that distributed generators, such as solar panels, wind turbines, fuel cells, diesel generators, gasoline generators and the like, are often dropped from the electric power grid during the power line fault response process even though electric service to the loads is automatically restored within a few seconds. Dropping the distributed generators from the power circuit during the fault response process is problematic because it requires several minutes for the dropped generators to electronically reconnect to the grid, which can take. Meanwhile, the loads remain connected to the same circuit section and "ride through" the momentary power interruption. As a result, the loads typically reconnected to the power circuit while the distributed generators drop out of connection, resulting in a circuit overload despite the otherwise successful fault isolation and power restoration to the circuit. When the power supplied by the distributed generators is required to meet the connected load on the circuit, the overload caused by the loss of the distributed generators may trip the feeder breaker resulting in a much wider outage. The resulting outage increases the number of affected customers, lengthens the outage, and complicates the power restoration process requiring staged reconnection of the distributed generators followed by reconnection of the loads.

The electric power industry therefore has a continuing need for new and more effective, economic, reliable and safe smart grid techniques. More specifically, there is a continuing need for fault detection, isolation and restoration systems that avoid dropping distributed generators during the power line fault response processes.

SUMMARY

The present invention solves the problems described above through a smart switch or an electric power distribution system including a number of cooperating of smart switches. The smart switches allow distributed generators to "ride through" non-three-phase faults by very quickly detecting a non-three phase fault, locating the fault, identifying the "responsive sectionalizer switches" that will be involved in clearing or isolating the fault, and selecting one or more of the responsive sectionalizer switches located downstream from the fault to direct back-feed tie switch operations. Closing a back-feed tie switch connects the distributed generator to the electric grid through an alternate feeder breaker to maintain synchronous connection to the electric power grid on the non-faulted phases during the ensuing fault clearing and isolation procedure. Th responsive sectionalizer switches trip only the faulted phase(s) while keeping the switches on the non-fault phase(s) closed, and instructs the back-feed tie switch to close prior to conducting the typical fault response operation. This typically occurs within a few cycles, typically about three cycles (50 milliseconds at 60 Hertz), and is completed before the normal fault clearing and isolation procedures, which momentarily disconnects all phases to the distributed generator from the normally connected feeder breaker. The looped connection to the alternate feeder breaker during the normal fault clearing and isolation procedures operations allows the distributed generators to "ride through" the fault response without losing connection and synchronism with the electric power grid. Although closing the back-feed tie switch before fully isolating the faulted section results in momentarily looped service on the non-faulted phase(s) to the distributed generator from two feeder breakers, the looped service is removed within a very short time period, e.g., 0.2 seconds when the responsive sectionalizer switches isolate the faulted section.

In a representative embodiment, each smart switch includes a smart switch for an electric power distribution system that includes a 3-phase physical line switch and a communication device for communicating with other similarly equipped smart switches A programmed switch controller detects a non-three-phase fault on a power line connected to the smart switch between a feeder breaker on an upstream side of the switch and a distributed generator on a downstream side of the switch. The switch controller determines a faulted phase, a faulted side of the smart switch, and a location of the fault on the power line. In response to detecting the location of the fault, the switch controller determines that the smart switch is a responsive sectionalizer switch designated to participate in fault clearing and isolation procedures for the fault and opens a first physical line switch in the faulted phase while leaving second physical line switch in a non-faulted phase closed. In response to determining that the smart switch is selected to perform back-feed operations for the fault, the switch controller notifies a selected back-feed tie switch to close to connect the distributed generator to the electric grid through an alternate feeder breaker. After or within 50 milliseconds before the back-feed tie switch has closed, the switch controller opens the second physical line switch in the non-faulted phase while maintaining synchronous connection to the distributed generator through the back-feed connection to the electric grid through the alternate feeder breaker.

The reclosing procedures for the faulted section may include full isolation by opening all phases of the upstream and downstream responsive sectionalizer switches followed by one to five closing and fault clearing attempts by the upstream responsive recloser switch while the downstream responsive sectionalizer switch remains open to isolate the downstream line sections from transients that can result from unsuccessful reclosing attempts. If the reclosing attempts are unsuccessful, all phases of both responsive sectionalize switches lock out for maintenance repair. Successful reclosing may result in the downstream switch persistently remaining opening and operating as a tie switch.

According to an aspect of an embodiment, the steps before the normal fault clearing and isolation procedure may be completed within a few electric power cycles. In addition, determining the location of the fault may include peer-to-peer communications among the smart switches and a differential protection scheme. The differential protection scheme may also include peer-to-peer communication of information identifying the faulted phase(s) and the faulted side of the smart switch. Notifying a selected back-feed tie switch to close to provide looped electric service on the non-faulted phase(s) to the healthy feeder sections may include selecting a nearest tie-switch or selecting a tie switch to a feeder breaker that is the least loaded, has the highest voltage, is experiencing the best power factor, has the least sensitive loads, has the lowest level of distributed generators, or some other criteria.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIG. 3 is a three-phase circuit diagram illustrating a first state of a multi-breaker electric circuit during the single-phase fault response procedure.

DESCRIPTION OF ILLUSTRATIVE EMBODIMENTS

Figure 1:
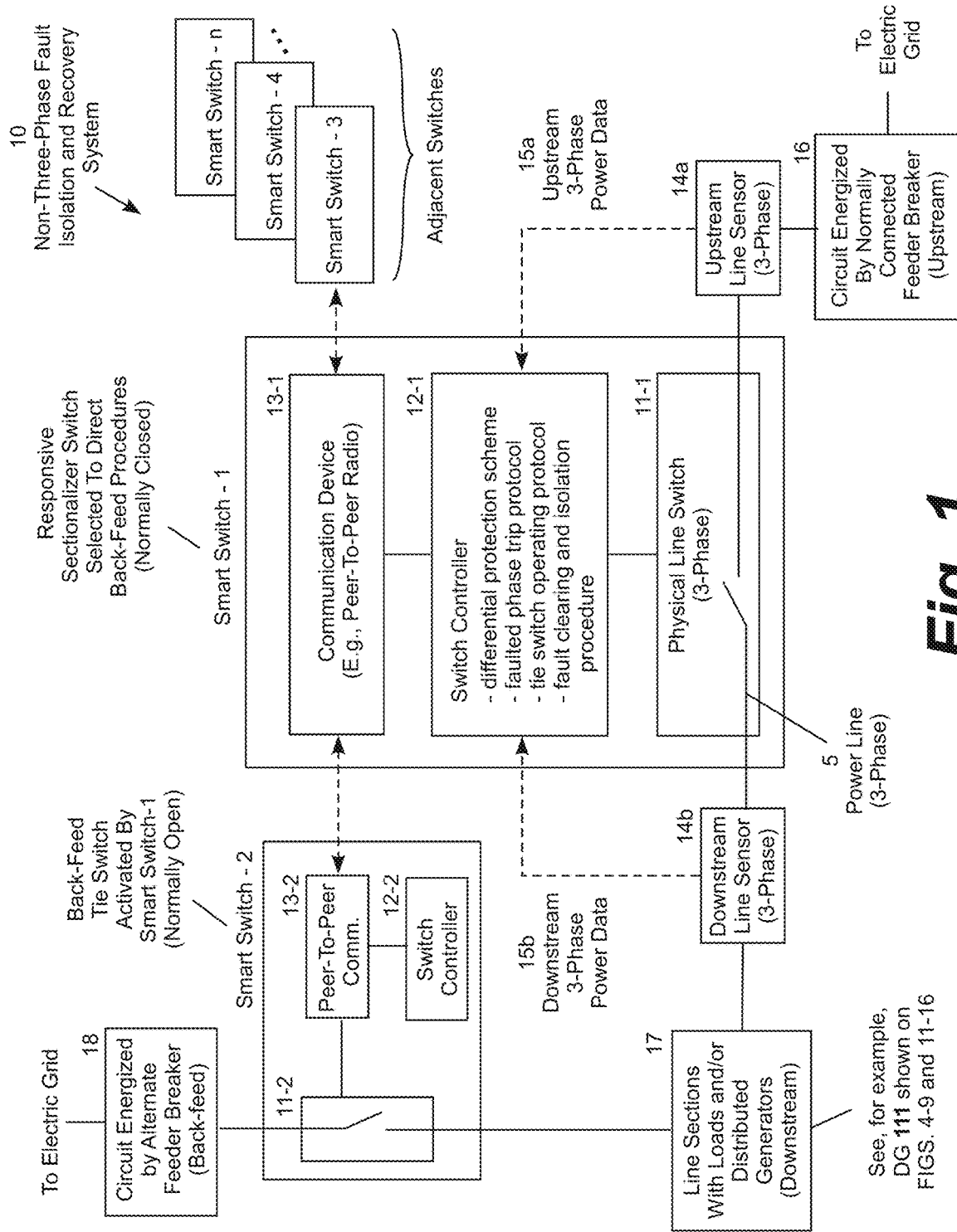
FIG. 1 is block diagram of an illustrative portion of a non-three-phase fault isolation and recovery system.

U.S. Publication Nos. 2019-0277904 and 2019-0280476, which are incorporated by reference, describe distribution automation techniques that do not rely on communications between the switches, which are well suited to remote circuit configurations where SCADA and peer-to-peer communication systems are not feasible. U.S. Pat. Nos. 8,659,862, 8,861,155, 8,866,487 and 9,823,637, which are also incorporated by reference, describe fault isolation techniques that determine fault direction and location using local 3-phase power measurements and inter-switch communication systems referred to generally as "differential protection" techniques. These differential protection techniques only require a very small data package with power line information limited to the faulted phase(s) and fault directionality to be exchanged between the smart switches, facilitating very quick differential protection schemes. Distributed generators are connected to the electric power grid by electric distribution power lines downstream from the feeder breaker lines, typically at substations, that connect the electric distribution power lines to the electric grid. In the conventional practice, the distributed generators lose synchronism with the electric grid and drop offline during normal power line fault detection, isolation and power restoration process. The present invention improves upon this technology by adding techniques to avoid dropping the distributed generators during the response to non-three-phase faults, which represent the vast majority of faults on electric distribution power lines.

In many cases, an increased presence of distributed generation resources justifies the installation of communication devices, such as peer-to-peer radio or fiber optic cables, among the switches to avoid dropping the distributed generators during non-three-phase fault responses. Most faults on distribution power lines are caused by lightening as well as tree limbs and animals temporarily shorting power line conductors, which almost always only affect only one or two phases. Most local loads inherently "ride through" the momentary outages experienced during typical fault response operations and repower immediately upon restoration of the electric service. Distributed generators, on the other hand, lose synchronism with the electric grid and quickly drop offline by opening all three phases drop offline during typical fault response operations. Circuit overloads can therefore occur immediately upon restoration of the electric service when the loads repower while the distributed generators drop offline. As the amount of distributed generation increases, preventing the distributed generators from dropping offline during typical fault response operations becomes an increasingly important objective. Since most faults encountered on electric distribution lines are non-three-phase faults, preventing the distribution generators from dropping offline during non-three-phase faults avoids these types of overloads from occurring during the vast majority of distribution line faults that can be automatically cleared.

The present invention may be embodied in a variety of electric power automation systems referred to as non-three-phase fault isolation and recovery systems, in which each electric power "smart switch" includes electric power line sensors allowing the switch to independently determine the faulted phase(s) and the directionality of electric power line faults, which may also be referred to as the "direction to the fault" or the "faulted side of the switch." Each smart switch also includes a communication device for communicating with other smart switches allowing them to conduct coordinated fault response procedures. Although peer-to-peer radios are usually the preferred type of communication devices, other types of communication devices may be used, such as a twisted-pair telephone wire, a fiber optic cable, a satellite radio link, a power line carrier system, a SCADA system, and so forth. Each smart switch detecting the fault determines the directionality of the fault and use communications among the switches to conduct differential protection schemes allowing the switches to determine the location of fault, which identifies the "responsive sectionalizer switches" that will be involved in fault clearing and isolation procedures for the fault. More specifically, adjacent smart switches determine the location of the fault as between those switches by determining that they detected the fault on the same phase(s) with opposite directionality, which is equivalent to determining that the directions of the fault from two adjacent switches are toward each other.

The smart switches also select one more of the responsive sectionalizer switches downstream from the detected fault to direct back-feed procedures to avoid dropping distributed generators during the ensuing fault clearing and isolation procedures. To do so, each selected sectionalizer switch instructs a selected back-feed tie switch to close, and momentarily provide looped service on the non-faulted phase(s) to the distributed generators, prior to conducting the reclosing procedures. This causes the distributed generators to "ride through" the normal fault clearing and isolation procedures, which momentarily opens all three phases to the normally connected feeder breaker. While the selected sectionalizer switch may ordinarily close the nearest tie switch, other selection criteria may be utilized, such as closing the tie switch to a feeder breaker that is the least loaded, has the highest voltage, is experiencing the best power factor, has the least sensitive loads, has the lowest level of distributed generators, or some other criteria.

To allow the distributed generators to "ride-through" non-three-phase faults, the smart switches very quickly detect a non-three-phase fault, locate the fault, identify the "responsive sectionalizer switches" that will be involved in clearing or isolating the fault, and select one or more of the responsive sectionalizer switches to direct back-feed tie switch operations. The responsive sectionalizer switches trip only the faulted phase(s) while leaving the non-faulted phase(s) closed. Each selected sectionalizer switch instructs a selected back-feed tie switch to close to back-feed the distributed generators prior to conducting the typical fault isolating operation. This typically occurs within a few power cycles, for example about three cycles (50 milliseconds at 60 Hertz), and is completed before the normal fault isolation procedures, which disconnect all three phases to the fault-affected feeder sections from the normally connected feeder breaker. The looped connection to an alternate feeder breaker during these operations allows the distributed generators to "ride-through" the normal fault clearing and isolation procedures. Although closing the back-feed tie switch before fully isolating the faulted section results in momentarily looped service on the non-faulted phases to the distributed generator from two feeder breakers, the looped service is removed within a very short time period, e.g., 0.2-0.3 seconds when the responsive sectionalizer switches fully isolate the faulted section.

Although the back-feed tie switch is ordinarily closed prior to fully isolating the faulted line section, the timing may be set to trip the non-faulted phases a short time before closing the back-feed tie switch provided that the distributed generators do not lose synchronism with the electric grid and drop offline. This generally requires closing the back-feed tie switch within a few cycles, such as 50 milliseconds, before opening the non-faulted phases. Therefore, after or within 50 milliseconds before the back-feed tie switch has been closed, the selected responsive sectionalizer switches fully isolate the faulted feeder section. Following the full isolation, the upstream switch attempts to go through its normal reclosing procedure to the isolated section, which typically includes one to five attempts to close all three phases. If the fault is not cleared, all of the responsive sectionalizer switches lock out to ensure permanent isolation of the faulted section and a service call is entered for a maintenance crew to repair the fault. If the fault temporary and the reclosing procedure is successful, the circuit is returned to normal operations with the selected responsive sectionalizer switch downstream from the fault becoming a tie switch with all three phases remaining open, and the previously closed tie switch remaining closed and operating as a sectionalizer switch. This changes the feeder breaker providing power to the distributed generators that rode through the fault to the alternate feeder breaker that was connected to those generators by closing the back-feed tie switch. Alternatively, the circuit may be returned to normal operations by closing the selected responsive sectionalizer switch and opening the back-feed tie switch, which returns the circuit to the topology before the fault with the distributed generators that rode through the fault powered from the same feeder breaker that was serving those generators before the fault.

In addition, each smart switch may be operated as a sectionalizer switch or as a tie switch with the only difference being that sectionalizer switches are normally closed while tie switches are normally open. A tie switch can therefore operate as a sectionalizer switch after it has been closed during a fault response procedure, and a sectionalizer switch can operate as a tie switch after it has been opened during a fault response procedure. As a result, the distribution circuit topology can change in the ordinary course of operations as smart switches change from sectionalizer to tie switch operation. That is, the circuit topology can change based on which smart switches are operating as sectionalizer switches (normally closed) an which smart switches are operating a tie switches (normally open). The number of potential circuit topologies is limited, however, and each switch can remain appraised of the current circuit topology through communications among the smart switches. This allows each sectionalizer switch to be programmed in advance with a tie switch operating protocol for selecting a desired back-feed tie switch for each circuit topology and faulted side of the switch that it might encounter. A corresponding tie switch for each sectionalizer switch can also be dynamically determined from the current circuit topology in advance for a possible fault at each side of the sectionalizer switch, which is also a part of the logic in tie switch operation protocol.

Turning now to the figures, FIG. 1 is block diagram of an illustrative portion of an electric power distribution system showing the components of a non-three-phase fault isolation and recovery system 10 for a 3-phase electric power line 5. The Smart Switch 1 includes a physical switch 11-1 in the electric power line 5, a programmable switch controller 12-1, and a communication device 13-1, such as a peer-to-pee radio, allowing the Smart Switch 1 to communicate with other similarly equipped switches. The physical switch 11-1 is a 3-phase electric power line switch, with each phase switch operated independently, for automatically connecting and disconnecting electric power flowing in the power line 5 as determined by the programmable switch controller 12-1. The physical switch 11-1 can be operated as a sectionalizer switch (normally closed) or a tie switch (normally open) under the control of the programmable switch controller 12-1. To explain the non-three-phase fault operations, the Smart Switch 1 is designated to be a "responsive sectionalizer switch" responding to a non-three-phase fault. That is, the Smart Switch 1 is the closest sectionalizer switch on one side of a non-three-phase fault detected by the switch, which will work in coordination one or more other responsive sectionalizer switches to attempt to clear or isolate the fault. The Smart Switch 1 is also a "selected" responsive sectionalizer switch designated to direct a selected back-feed tie switch to close to protect a distributed generator from dropping offline during the fault response procedures.

The Smart Switch 1 is a sectionalizer switch connecting the "upstream" circuit 16 energized by the normally connected feeder breaker, which connects to the electric power grid, with the "downstream" line sections 17 providing electric service to loads and/or distributed generators connected to the downstream line sections 17. The Smart Switch 2 is a tie switch connecting the "back-feed" circuit 18 energized by an alternate feeder breaker, which also connects to the electric power grid, with the downstream line sections 17 providing back-feed electric service to the loads and/or distributed generators connected to the downstream line sections 17 when the Smart Switch 2 closed. The switch controller performs a number of functions, several of which are relevant to embodiments of the present invention, including a differential protection scheme, a faulted phase trip protocol, a tie switch protocol, and a fault clearing and isolation timing procedure. The Smart Switch 1 also includes an upstream 3-phase line sensor 14a and a downstream 3-phase line sensor 14b on the upstream and downstream sides of the switch, which continually provide the switch controller 12-1 with measured upstream 3-phase power line data 15a and measured downstream 3-phase power line data 15b, respectively. These measurements typically include 3-phase current measurements obtained locally with current transformers (CTs) and some representation of the 3-phase voltages or voltage angles. The Smart Switch 1 uses these measurements to detect non-three-phase line faults and determine the directionality the line faults on the power line 5. The Smart Switch 1 also uses these measurements, along with communications among the smart switches, to determine the locations of the faults through the differential protection scheme.

The Smart Switch 1 exchanges faulted phase(s) and fault directionality information with the other sectionalizer switches, Smart Switches 3-n, to determine that the Smart Switch 1 is one of the responsive sectionalizer switch for a representative non-three-phase fault, which is referred to as the "differential protection scheme." In response to determining that it is designated as one of the responsive sectionalizer switches, the Smart Switch 1 trips (opens) only the faulted phase(s) while leaving the non-faulted phase(s) closed, which is referred to as the "faulted phase trip protocol." In addition, in response to determining that it is selected to direct back-feed procedures for this particular non-three-phase fault, the Smart Switch 1 activates the selected back-up tie switch for this type of fault, Smart Switch 2, to close to back-feed the downstream line sections 17, which is referred to as the "tie switch operating protocol." More specifically, the Smart Switch 1 instructs the Smart Switch 2 to close using the communication devices 13-1 and 13-2 to send messages between these switches. This maintains continuous non-three-phase electric service for the downstream line sections 17 during the ensuing fault clearing and isolation procedure conducted by the Smart Switch 1. Maintaining this continuous non-three-phase electric service keeps the distributed generators in continuous connection and synchronism with the electric grid to prevent the distributed generators connected to the downstream line sections 17 from dropping offline during the fault clearing and isolation procedure conducted by the Smart Switch 1. The differential protection scheme, the faulted phase trip protocol, and the tie switch operating protocol are typically performed very quickly, for example within about three electric power cycles (50 milliseconds at 60 Hertz), and completed before the ensuing the full isolation of faulted section and the reclosing procedure, which typically takes place over several seconds.

Figure 2A:
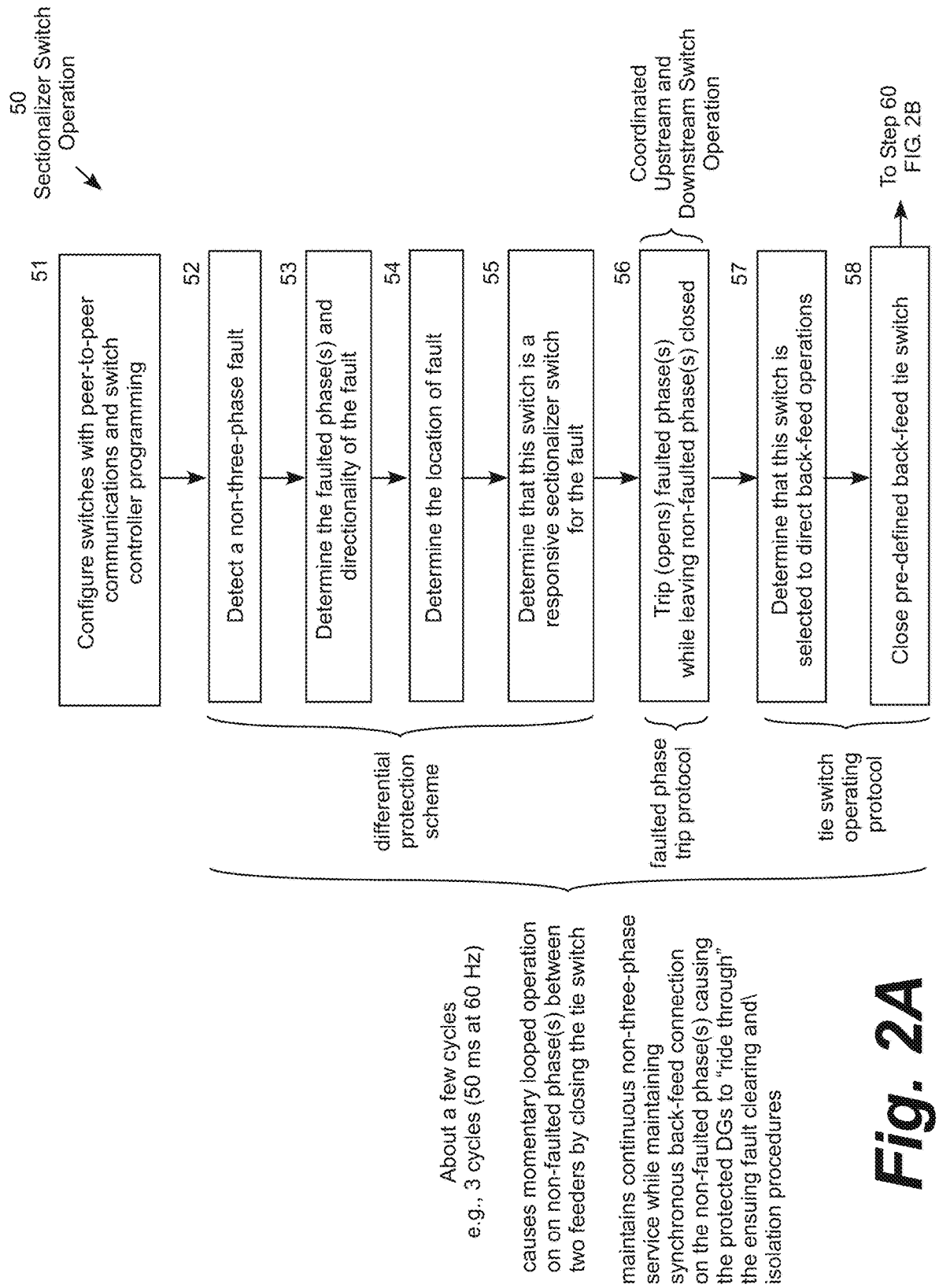
FIGS. 2A-2B is a logic flow diagram for a non-three-phase fault response procedure.
Figure 2B:
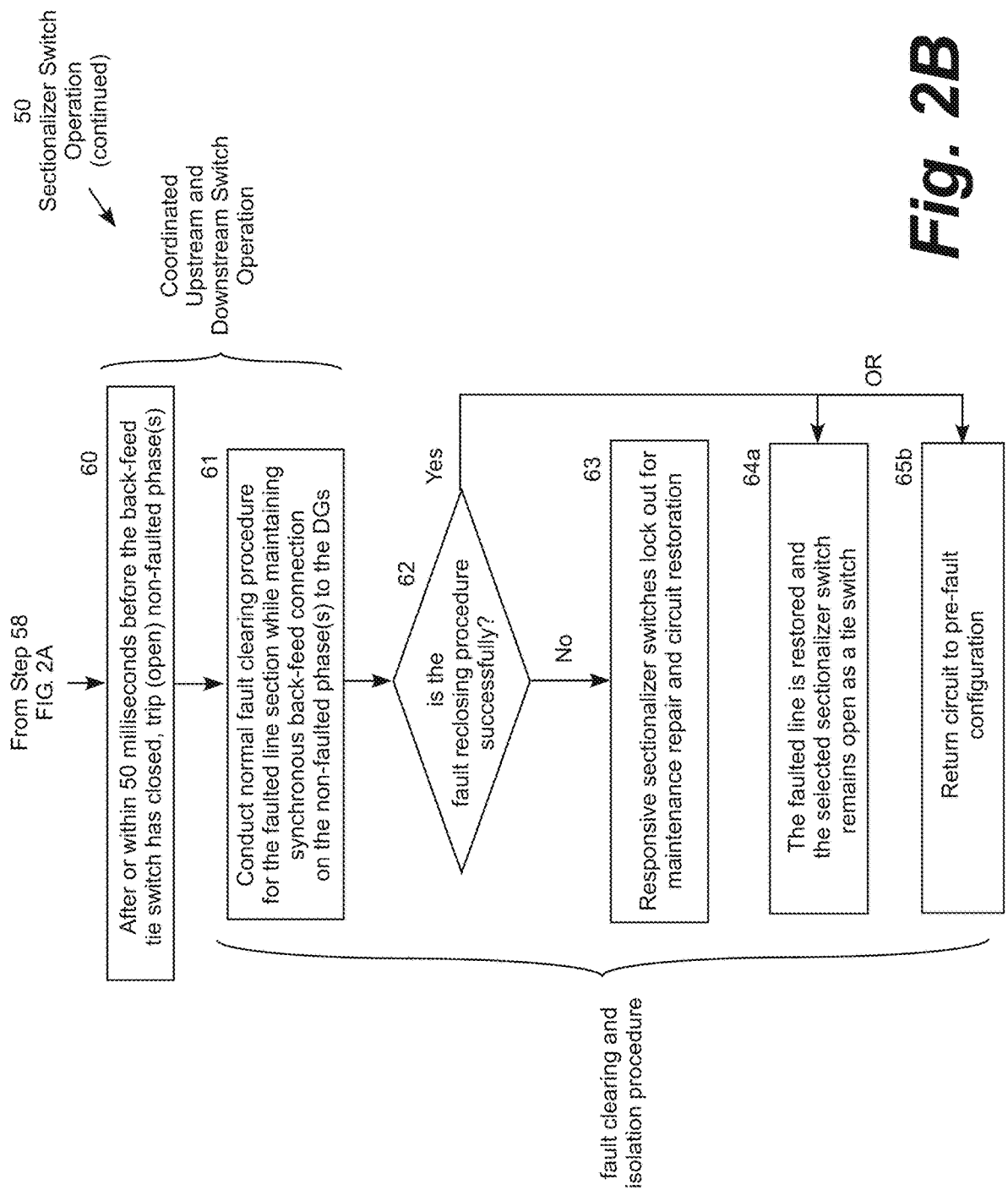

FIGS. 2A-2B are a logic flow diagram illustrating the operation of the selected responsive sectionalizer switch, represented by the Smart Switch 1 in FIG. 1, in response to a non-three-phase fault. Referring to FIG. 2A, in step 51 the sectionalizer and tie switches in a multi-feeder distribution system are configured with communication devices and programmed with their respective controller switch programming. The switch controller programming includes a differential protection scheme, a faulted phase trip protocol, a tie switch operating protocol, and a fault clearing and isolation procedure, as described above with reference to FIG. 1. Step 51 is followed by step 52, in which the sectionalizer switch detects a non-three-phase fault on its associated power line. Referring to FIG. 1, the non-three phase fault occurs on the line sections 16 between the feeder breaker 16 (upstream) and a distributed generator (downstream). Step 52 is followed by step 53, in which the sectionalizer switch determines the faulted phase(s) and directionality to the fault. In other words, the switch determines which phase(s) are fault and the faulted side of the switch. Step 53 is followed by step 54, in which the sectionalizer switch engages in communications with the other smart switches in the multi-feeder distribution system to determine the location of the fault. Step 54 is followed by step 55, in which the sectionalizer switch determines whether it is a responsive sectionalizer switch that will be involved in fault clearing and isolation procedures for the detected non-three-phase fault. The switch uses the fault location information to determine whether it the closest sectionalizer switch on one side of the fault. If so, it determines that it is one of the responsive sectionalizer switches that will be involved in fault clearing and isolation procedures for the detected fault. Steps 52 through 55 are referred to as the "differential protection scheme" in which the switch uses differential phase current measurements, voltage and/or voltage angle information, and communications among the smart switches to resolve the nature and location of the fault.

Step 55 is followed by step 56, in which the sectionalizer switch trips (opens) only the faulted phase(s) while leaving the non-faulted phase(s) connected. Step 56 is typically coordinated by the upstream and downstream sectionalizer switches isolating the fault so that the fault phase(s) are open on both sides of the fault after step 56. This is referred to as the "faulted phase trip protocol." Step 56 is followed by step 57, in which the responsive sectionalizer switch determines that it is selected to direct back-feed operation for the detected non-three-phase fault. In this example, the switch uses the fault location information to determine whether it is located downstream from the detected fault. If so, the switch determines that it is selected to direct back-feed operations to prevent the distributed generator from dropping offline during the ensuing fault clearing and isolation procedures. Step 57 is followed by step 58, in which the sectionalizer switch utilizes communications, in this example peer-to-peer radio communications, to close the back-feed tie switch selected to provide back-feed power for the distributed generators during the non-three-phase fault. Step 57 and 58 are referred to as the "tie switch operating protocol." Step 58 results in momentary looped connection from two feeder breakers (in FIG. 1, the circuit 16 energized by the normally connected feeder breaker and the circuit 18 energized by the alternate feeder breaker) non-faulted phase(s) to the protected distributed generators (in IG. 1 connected to the line sections 17), which maintains continuous non-three-phase service to the protected distributed generator to prevent it from losing synchronism with the electric power grid and dropping offline during the ensuing fault clearing and isolation procedures. Steps 52 through 58 are completed very quickly, for example within about 3 electric power cycles (50 milliseconds at 60 Hertz), before the full isolation of the faulted section that occurs during the ensuing reclosing and isolation procedures, which typically take place over several seconds.

Referring now to FIG. 2B, Step 58 is followed by step 60, in which sectionalizer switch trips (opens) the non-faulted phase(s). Steps 60 and 61 are typically coordinated by the upstream and downstream sectionalizer switches isolating the fault so that all three phases of the faulted line section are open on both sides of the fault after step 60. Although the back-feed tie switch is ordinarily closed prior to fully isolating the faulted line section, the timing may be set to trip the non-faulted phases a short time before closing the back-feed tie switch provided that the distributed generators do not lose synchronism with the electric grid and drop offline. This generally requires closing the back-feed tie switch after or within a few cycles, such as 50 milliseconds, before opening the non-faulted phases. Step 60 is followed by step 61, in which the sectionalizer switch conducts its normal fault clearing procedures, which typically involves full isolation by all responsive sectionalizer switches on both sides of the fault opening all three phases, followed by one to five attempts to reclose faulted phase(s) separated by a few seconds. In step 61, the upstream switch typically performs the reclosing attempts while the downstream sectionalizer switch is open to isolate the downstream loads and distributed generators from transients that can result from unsuccessful switch reclosing attempts. Step 61 is followed by step 62, in which the sectionalizer switch determines whether the fault was successfully cleared. If the fault was not successfully cleared, the "No" branch is followed from step 62 to step 63, in which all of the responsive sectionalizer switches lock open and a service call is initiated for a maintenance crew to physically inspect and repair the fault. If the fault was successfully cleared, the "Yes" branch is followed to step 64a or 64b. In step 64a, the faulted line is restored with the selected sectionalizer switch (Smart Switch 1 in FIG. 1) remaining open to continue operation as a tie switch, and the back-feed tie switch (Smart Switch 2 in FIG. 1) remaining closed to continue operation as a sectionalizer switch. This changes the feeder breaker serving the protected distributed generator from the original feeder breaker switched out by opening the selected sectionalizer switch (Smart Switch 1 in FIG. 1) to the alternate feeder breaker switched in by closing the back-feed tie switch (Smart Switch 2 in FIG. 1). Alternatively, in step 64b, the faulted line is restored by returning the circuit to its pre-fault condition with the selected sectionalizer switch (Smart Switch 1 in FIG. 1) remaining closed to continue operation as a sectionalizer switch, and the back-feed tie switch (Smart Switch 2 in FIG. 1) remaining open to continue operation as a tie switch.

FIGS. 3-8 provide context by illustrating this procedure for an example single-phase fault in a representative multi-breaker distribution circuit. FIGS. 10-15 provide additional context by illustrating this procedure for a representative double-phase fault in the representative multi-breaker distribution circuit 111. These figures illustrate an example single-phase fault response (FIGS. 3-8) and an example double-phase fault response (FIGS. 9-15) including procedures utilized to prevent a representative distributed generator (DG) 112 from losing synchronism with the electric grid and dropping offline during the fault clearing, isolation and restoration procedures.

Figure 4:
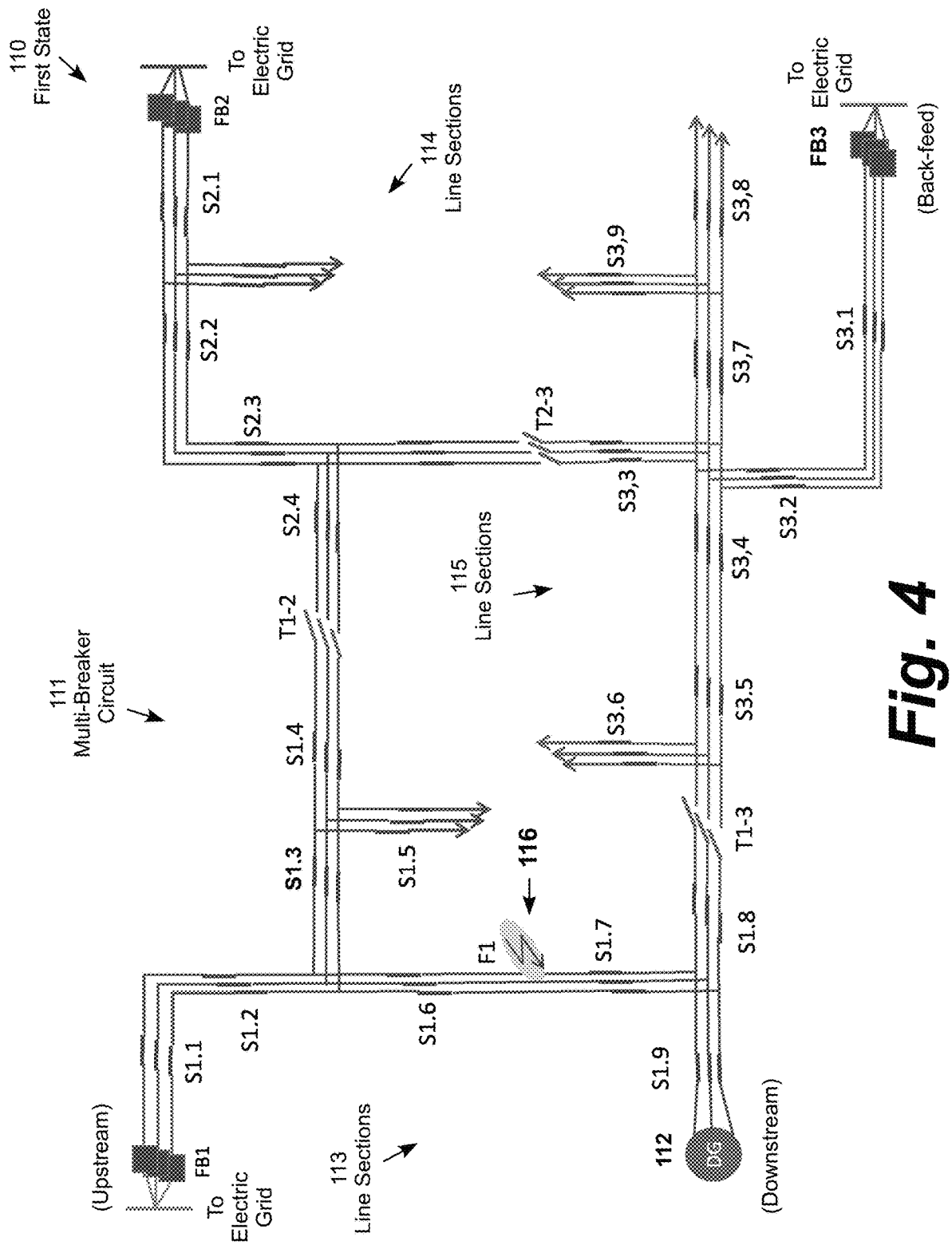
FIG. 4 is a three-phase circuit diagram illustrating a second state of the electric circuit during the single-phase fault response.

Referring to FIG. 4, the multi-breaker distribution circuit 111 includes a first feeder breaker FB1 upstream from the DG 112 that energizes line sections 113 that normally provide electric service to the DG 112. The normally closed sectionalizer switches S1.1 through S1.8 connect the line sections 113 to the first feeder breaker FB1. The multi-breaker distribution circuit 111 also includes a second feeder breaker FB2 that energizes line sections 114. The normally closed sectionalizer switches S2.1 through S2.4 connect the line sections 114 to the second feeder breaker FB2. A normally open tie switch T1-2 is operative to selectively close to connect the line sections 113 with the line sections 114 so that the first feeder breaker FB1 can back-feed the line sections 114 normally energized by the second feeder breaker FB2, and the second feeder breaker FB2 can back-feed the line sections 113 normally energized by the first feeder breaker FB1. In addition, the multi-breaker distribution circuit 111 also includes a third feeder breaker FB3 that energizes line sections 115. The normally closed sectionalizer switches S3.1 through S1.9 connect the line sections 115 to the third feeder breaker FB3. A normally open tie switch T2-3 is operative to selectively close to connect the line sections 115 with the line sections 114 so that the second feeder breaker FB2 can back-feed the line sections 115 normally energized by the third feeder breaker FB3, and the second feeder breaker FB2 can back-feed the line sections 115 normally energized by the third feeder breaker FB3. Similarly, a normally open tie switch T1-3 is operative to selectively close to connect the line sections 115 with the line sections 113 so that the first feeder breaker FB1 can back-feed the line sections 115 normally energized by the third feeder breaker FB3, and the first feeder breaker FB1 can back-feed the line sections 113 normally energized by the first feeder breaker FB1. These sectionalizer switches and tie switches are configured as described with reference to FIGS. 1 and 2 and may selective operate as sectionalizer switches or tie switches depending on whether they are normally closed sectionalizer switches or normally open tie switches.

FIG. 3 is a logic flow diagram illustrating a single-phase fault response procedure 100, which refers to the three-phase multi-breaker distribution circuit 111 shown in FIGS. 4-8 to illustrate the fault clearing, isolation and restoration procedures for this example. In step 101, the sectionalizer switches and tie switches shown in FIGS. 4-8 are configured with communication devices and switch controllers programmed to allow them to implement coordinated differential protection schemes, faulted phase trip protocol, tie switch operating protocols, and fault clearing and isolation protocols as described with reference to FIGS. 1 and 2. Step 101 is followed by step 102, in which a single-phase fault, shown as event 116 in FIG. 4 representing the first state 110 of the circuit 111, occurs on the line sections 113 energized by the first feeder breaker FB1 between the sectionalizer switches S1.6 and S1.7.

Figure 5:
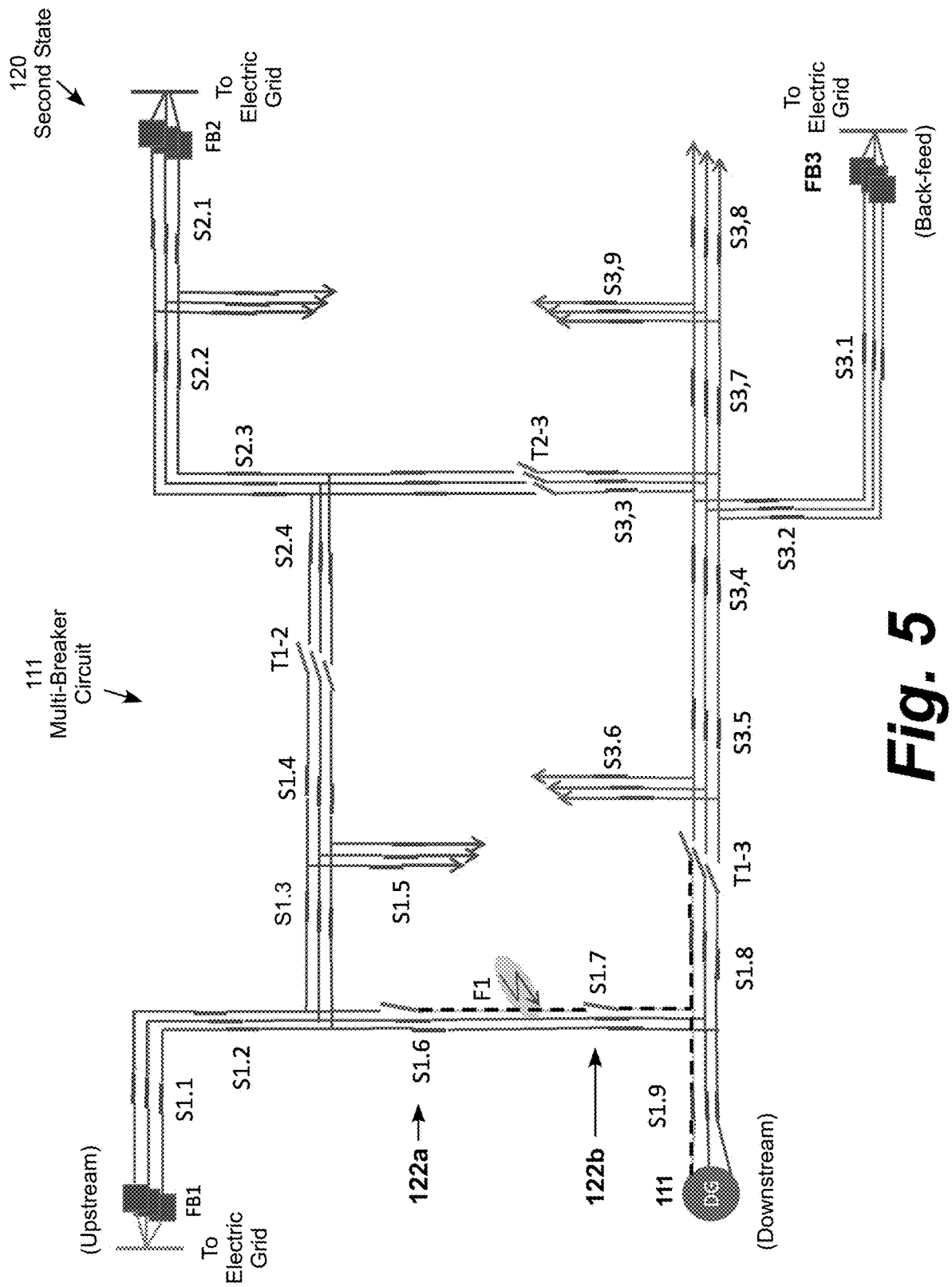
FIG. 5 is a three-phase circuit diagram illustrating a third state of the electric circuit during the single-phase fault response.

Step 102 is followed by step 103, in which each sectionalizer switch S1.1 through S1.7 energized by the first feeder breaker FB1 detects the fault (i.e., determines which phase(s) are faulted) and they cooperative implement a differential protection scheme to determine the directionality of the fault (i.e., which side of each switch is faulted), and conduct communications among the switches to locate the fault (i.e., determine which sectionalizer switches are closest to the fault on the upstream side and the downstream sides of the fault). For example, the communications may include power line information limited to identifying the faulted phase and the faulted side of the switch to minimize the size of the data packages transmitted in the communications, which allows the differential protection scheme to be completed very quickly. In this example, the differential protection scheme identifies the sectionalizer switches S1.6 and S1.7 as the responsive sectionalizer switches that will conduct fault clearing and isolation procedures for the single-phase fault (event 116) occurring between these switches. These switches then implement their faulted phase trip protocol to trip (open) the faulted phase on both sides of the fault while leaving the non-faulted phases open, which is shown as events 122a and 122b in FIG. 5 representing the second state 120 of the circuit 111. The single-phase line sections deenergized by the faulted phase trip protocol are shown in dashed lines in FIG. 5.

Figure 6:
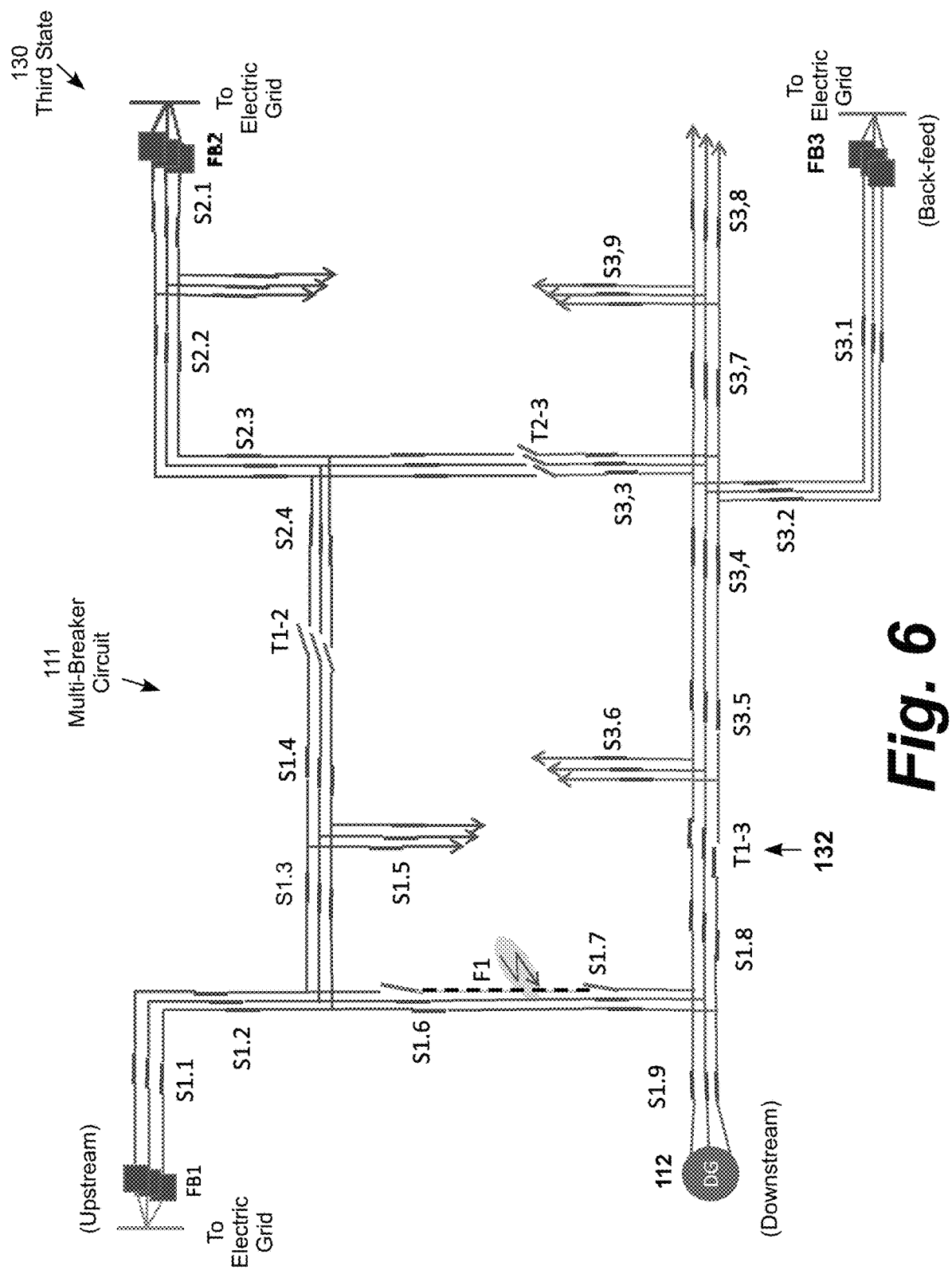
FIG. 6 is a three-phase circuit diagram illustrating a fourth state of the electric circuit during the single-phase fault response.

Step 103 is followed by step 104, in which the tie switch operating protocol selects the responsive sectionalizer switch S1.7 to direct back-feed operations to prevent the DG 112 from losing synchronism with the electric grid and dropping offline during the ensuing the fault clearing and isolation procedures. The sectionalizer switch S1.7 is selected to conduct the back-feed operations because it is located downstream from the detected fault. The selected responsive sectionalizer switch S1.7 notifies the selected tie switch T1-3 designated for this type of fault to close in order to back-feed the DG 112 from the third feeder breaker FB-3, which is shown as event 132 in FIG. 6 representing the third state 130 of the circuit 111. This reduces the deenergized single-phase line section to the dashed line in FIG. 6 and momentarily implements looped service on the non-faulted phases serving the DG 112 from both the first feeder breaker FB-1 and the third feeder breaker FB-3. Steps 102 through 104 occur very quickly, typically within a few electric power cycles, e.g., about 3 electric power cycles (50 milliseconds at 60 Hertz) and before the ensuing normal fault clearing and isolation procedures implemented by the responsive sectionalizer switches S1.6 and S1.7, which are shown in the ensuing steps 105 through 109a-109b. It should be noted that peer-to-peer communications can be used to detect faults between these two positions should a fault occur between them and will enable opening both ends should a fault occur during this temporary looped condition. This process is the same as in the pre-fault condition for radial circuits where there is a phase fault. The historical phase fault detection system of radial distribution circuits are overcurrent based. Hence in a looped condition, all circuits would normally be energized to trip when a fault occurs in a looped condition. This differential scheme quickly detects this looped fault and isolates it quickly.

Figure 7:
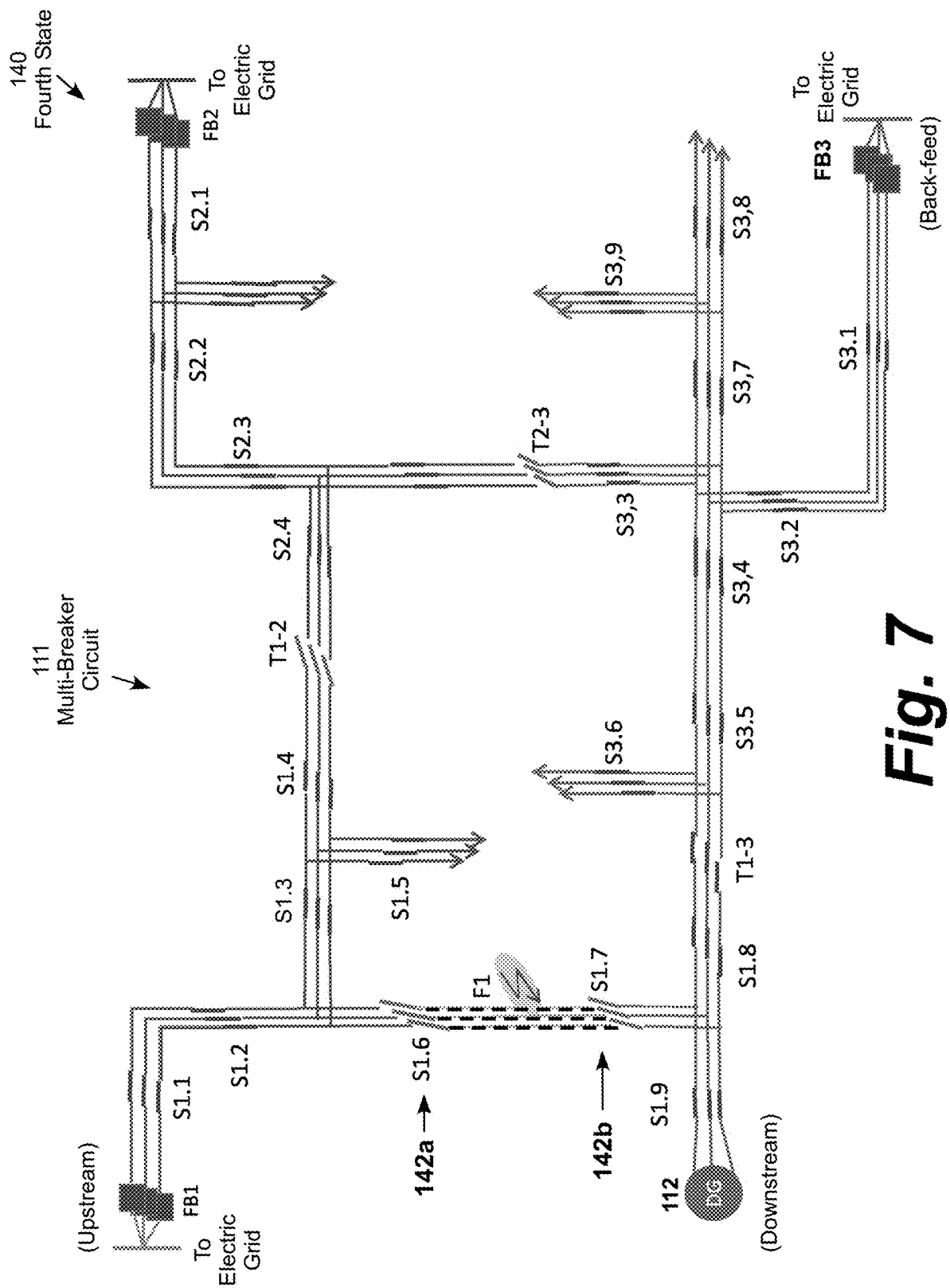
FIG. 7 is a three-phase circuit diagram illustrating a fifth state of the electric circuit during the single-phase fault response.
Figure 8:
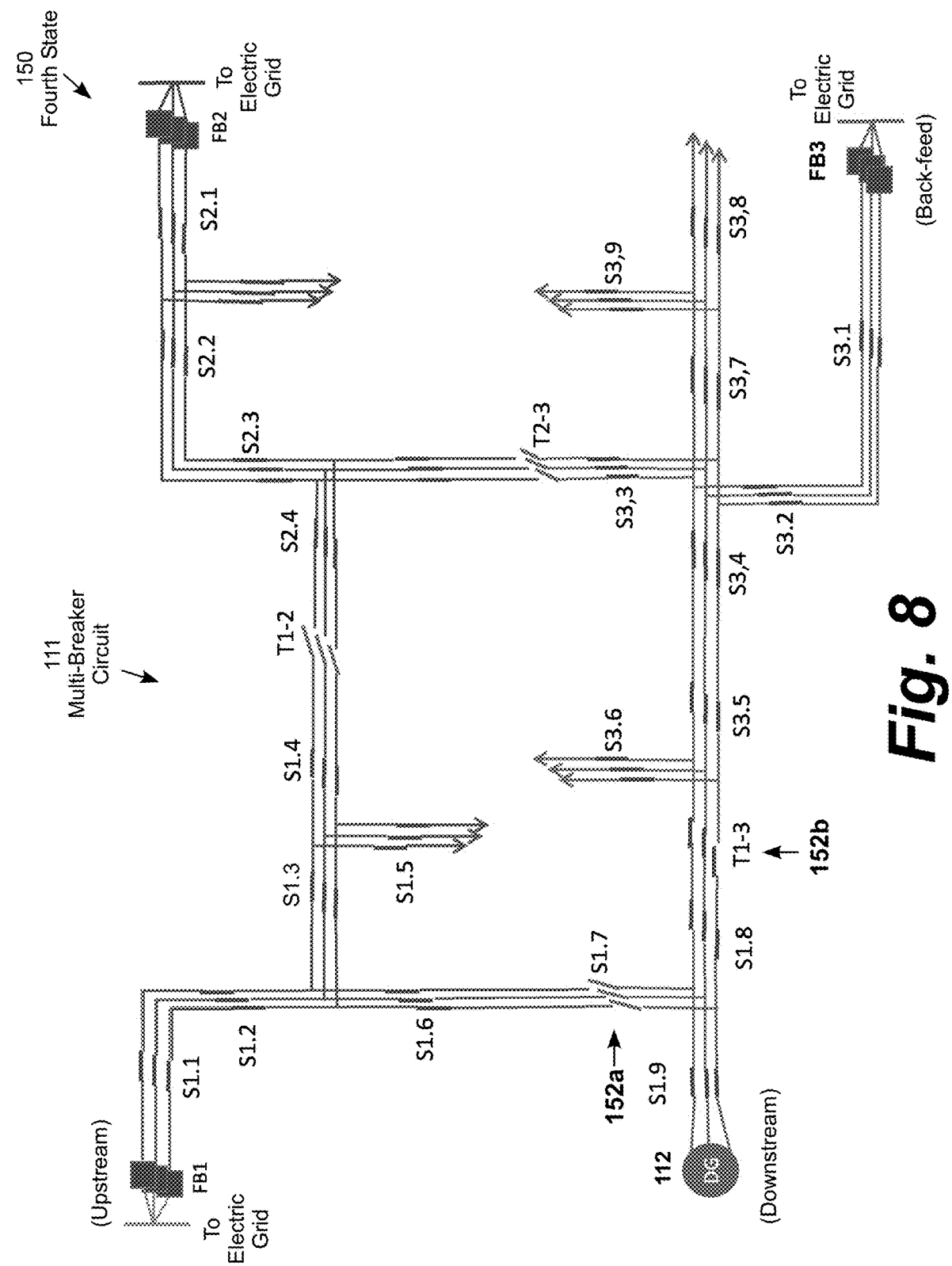
FIG. 8 is a three-phase circuit diagram illustrating a sixth state of the electric circuit during the single-phase fault response.

Step 104 is followed by step 105, in which the responsive sectionalizer switches S1.6 and S1.7 initiate their normal fault clearing and isolation procedures by opening the non-faulted phases, which is shown as events 142a and 142b in FIG. 7 representing the fourth state 140 of the circuit 111. Although the back-feed tie switch is ordinarily closed prior to fully isolating the faulted line section, the timing may be set to trip the non-faulted phases a short time before closing the back-feed tie switch provided that the distributed generators do not lose synchronism with the electric grid and drop offline. This generally requires closing the back-feed tie switch after or within a few cycles, such as 50 milliseconds, before opening the non-faulted phases. Step 105 is followed by step 106, in which one of the responsive sectionalizer switches continues normal fault clearing and isolation procedure with one to five attempts to close faulted phase(s)

separated by a few seconds. In this example, the upstream responsive sectionalizer switch S1.6 is selected to conduct the reclosing and fault clearing to avoid transients on the downstream line sections that could occur from unsuccessful line closing attempts.

Step 106 is followed by step 107, in which the responsive sectionalizer switch S1.6 or S1.7 determines whether the closing attempts were successful. If the fault was not successfully cleared, the "No" branch is followed from step 107 to step 180, in which the responsive sectionalizer switches lock open as shown in FIG. 7 and a service call is initiated for a maintenance crew to physically inspect and repair the fault. If the fault was successfully cleared, the "Yes" branch is followed to step 109a or 109b. In step 109a, the faulted line is restored with the selected sectionalizer switch S1.7 remaining open to continue operation as a tie switch, and the back-feed tie switch T1-3 remaining closed to continue operation as a sectionalizer switch as shown as event 152a and 152b in FIG. 8. This changes the feeder breaker serving the protected distributed generator DG 112 from the first feeder breaker FB1 switched out by opening the selected sectionalizer switch S1.7 to the third feeder breaker FB3 switched in by closing the back-feed tie switch T1-3. Alternatively, in step 109b, the faulted line is restored by returning the circuit to its pre-fault condition shown in FIG. 4 with the selected sectionalizer switch S1.7 remaining closed to continue operation as a sectionalizer switch, and the back-feed tie switch T1-3 remaining open to continue operation as a tie switch.

Figure 9:
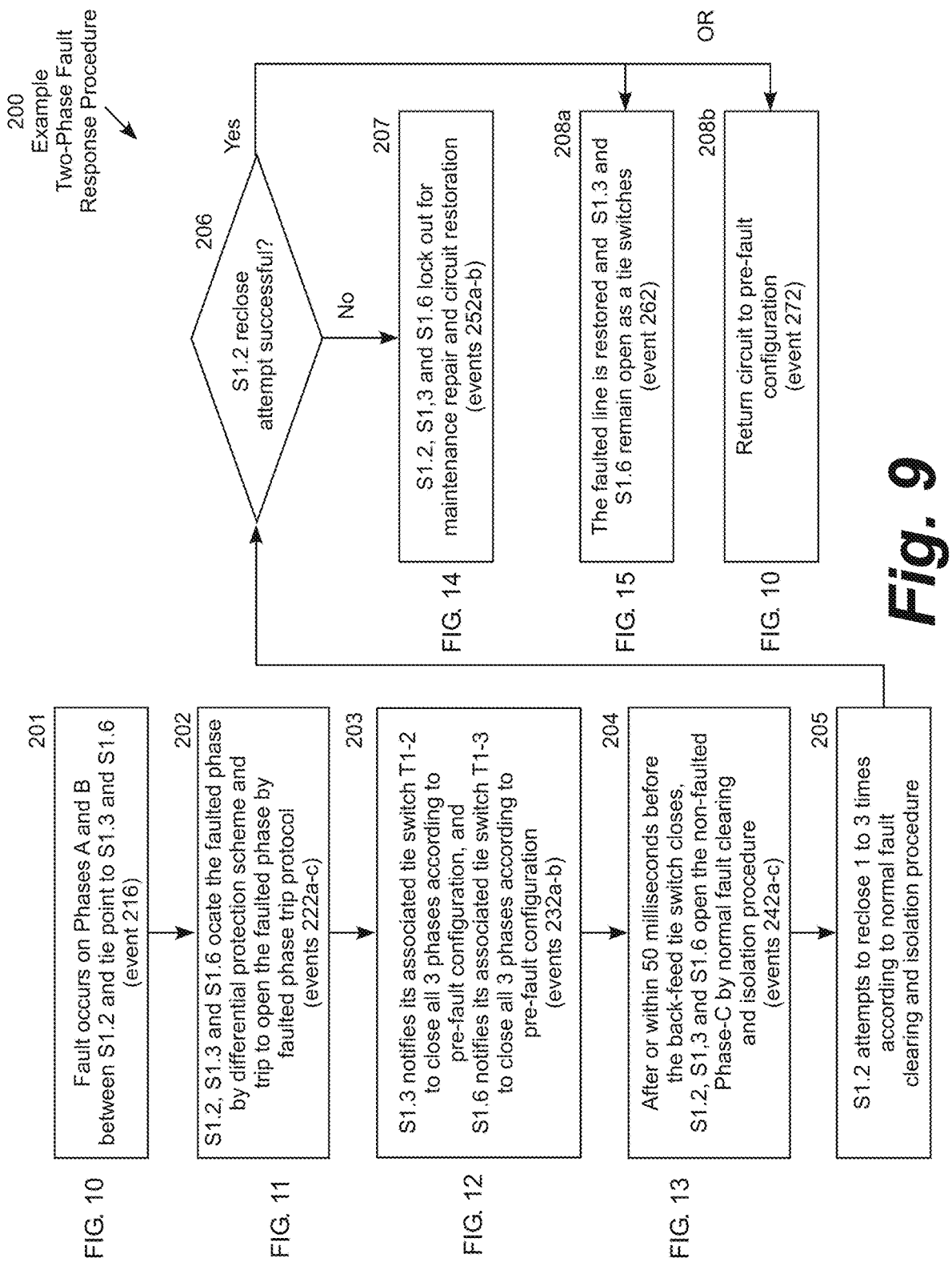
FIG. 9 is a logic flow diagram for a two-phase fault response procedure.

FIG. 9 is a logic flow diagram illustrating a double-phase fault response procedure 200, which refers to the three-phase multi-breaker distribution circuit 111 shown in FIGS. 10-15 to illustrate the fault clearing, isolation and restoration procedures for this example. FIG. 9 follows configuration of the sectionalizer and tie switches with communication devices and switch controller programming allowing them to implement coordinated differential protection schemes, faulted phase trip protocol, tie switch operating protocols, and fault clearing and isolation protocols as described with reference to FIGS. 1 and 2.

Figure 10:
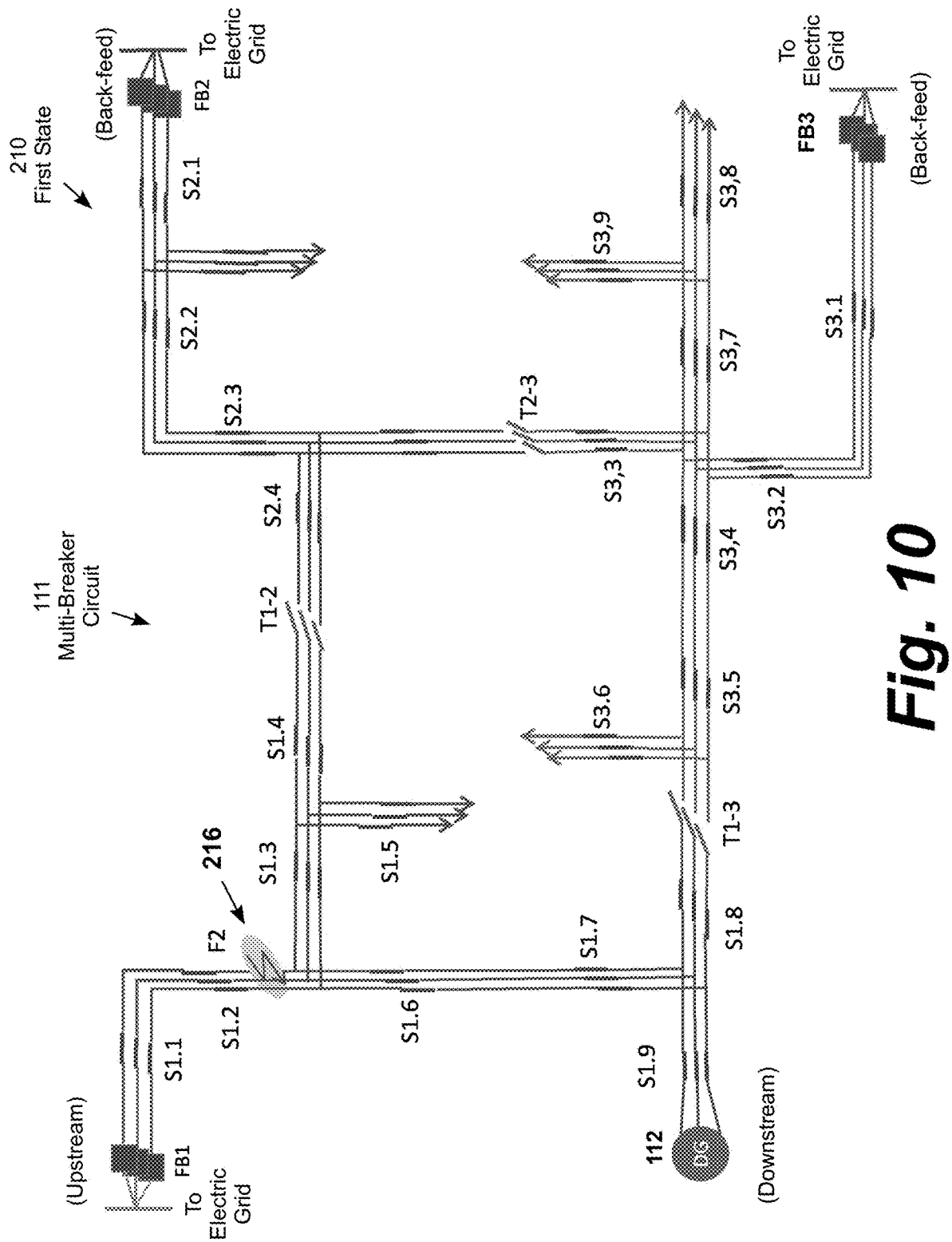
FIG. 10 is a three-phase circuit diagram illustrating a first state of the electric circuit during the two-phase fault response procedure.
Figure 11:
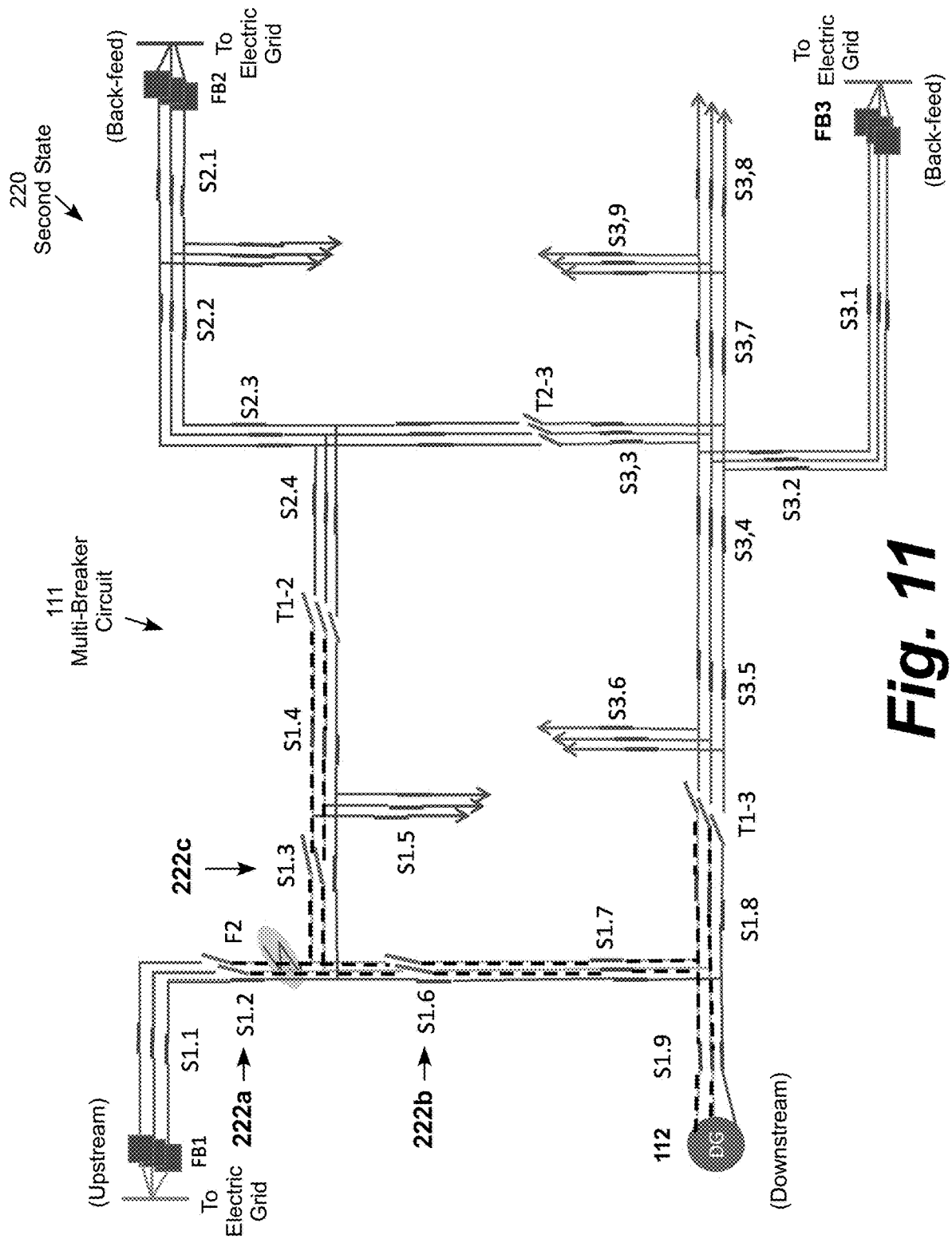
FIG. 11 is a three-phase circuit diagram illustrating a second state of the electric circuit during the two-phase fault response.

In step 201, a double-phase fault, shown as event 216 in FIG. 10, representing the first state 210 of the circuit 111, occurs on the line sections 113 energized by the first feeder breaker FB1 between the sectionalizer switches S1.7 and a tap point leading to sectionalizer switches S1.3 and S1.6. Step 201 is followed by step 202, in which each sectionalizer switch S1.1 through S1.7 energized by the first feeder breaker FB1 detects the fault (i.e., determines which phase(s) are faulted) and they cooperatively implement a differential protection scheme to determine the directionality of the fault (i.e., which side of the switch is faulted), and conduct communications among the switches to locate the fault (i.e., determine which sectionalizer switches are closest to the fault on the upstream side and the downstream sides of the fault). For example, the communications may include power line information limited to identifying the faulted phases and the faulted side of the switch to minimize the size of the data packages transmitted in the communications, which allows the differential protection scheme to be completed very quickly. In this example, the differential protection scheme identifies the sectionalizer switches S1.2, S1.3 and S1.6. as the responsive sectionalizer switches that will conduct fault clearing and isolation procedures for the double-phase fault (event 216) occurring between these switches. These switches then implement their faulted phase trip protocol to trip (open) the faulted phases while leaving the non-faulted phase open, which is shown as events 222a, 222b and 222c in FIG. 11 representing the second state 220 of the circuit 111. The double-phase line sections deenergized by the faulted phase trip protocol are shown in dashed lines in FIG. 11.

Figure 12:
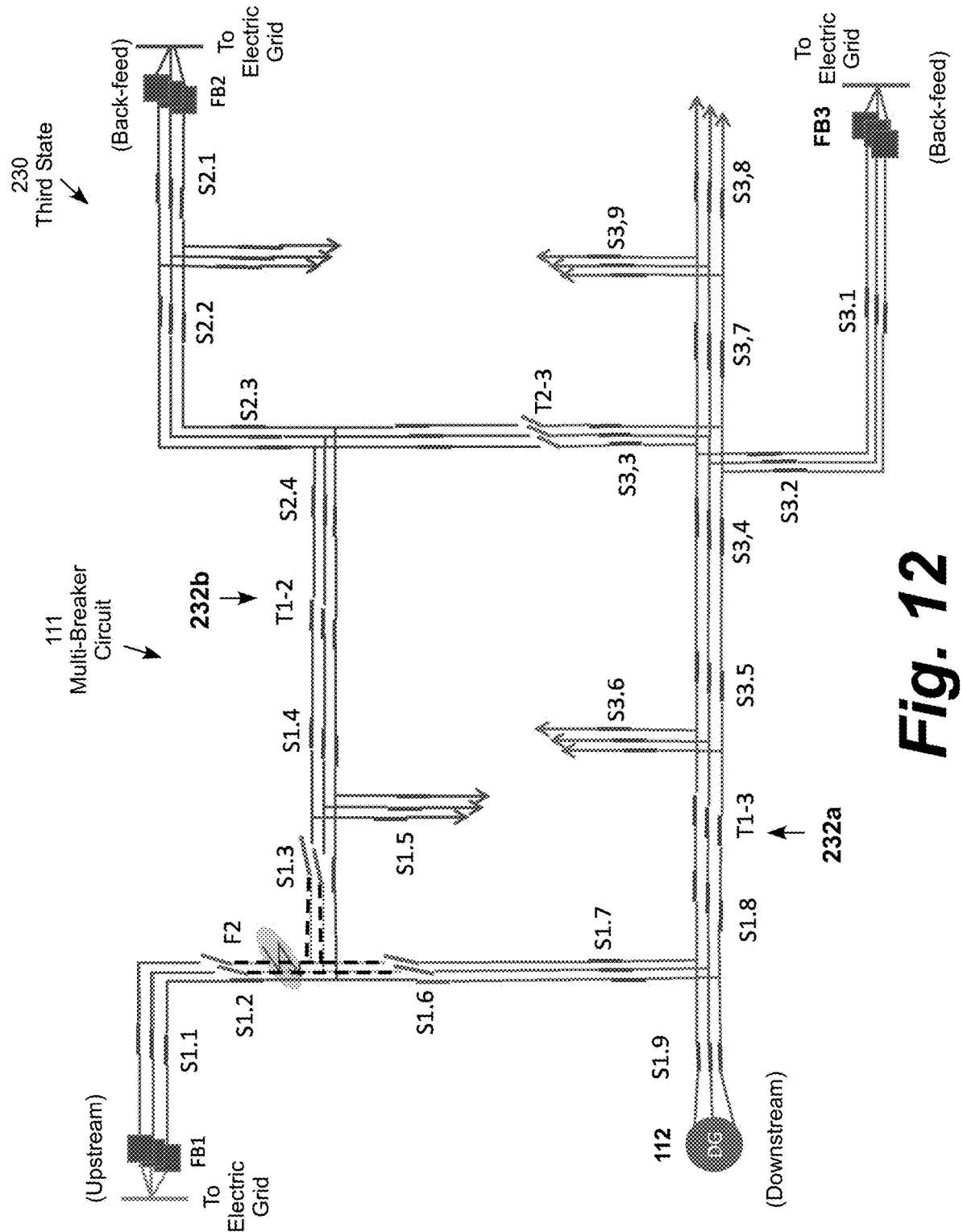
FIG. 12 is a three-phase circuit diagram illustrating a third state of the electric circuit during the two-phase fault response.

Step 202 is followed by step 203, in which the tie switch operating protocol selects the responsive sectionalizer switch S1.3 to direct back-feed operations to prevent the DG 112 from losing synchronism with the electric power grid and dropping offline during the ensuing the fault clearing and isolation procedures. The sectionalizer switch S1.3 is selected to direct back-feed operations because it is located downstream from the detected fault. The selected responsive sectionalizer switch S1.3 uses communications among the switches to notify the selected tie switch T1-2 designated for this type of fault to close in order to back-feed the feeder sections from the second feeder breaker FB-2, which is shown as event 232a in FIG. 12 representing the third state 130 of the circuit 111. The tie switch operating protocol also selects the responsive sectionalizer switch S1.6 to direct back-feed operations to prevent the DG 112 from losing synchronism with the electric power grid dropping offline during the ensuing fault clearing and isolation procedures. Again the sectionalizer switch S1.6 is selected to direct back-feed operations because it is also located downstream from the detected fault. The selected responsive sectionalizer switch S1.6 uses communications among the switches to notify the selected tie switch T1-3 designated for this type of fault to close in order to back-feed the DG 112 from the third feeder breaker FB-3, which is shown as event 232b in FIG. 12 representing the third state 130 of the circuit 111. This reduces the deenergized double-phase line section to the dashed lines in FIG. 12 and momentarily implements looped service to the non-faulted phases serving the DG 112 from the first feeder breaker FB-1, the second feeder breaker FB-2, and the third feeder breaker FB-3. Steps 201 through 203 occur very quickly, typically within a few electric power cycles, e.g., 3 electric power cycles (50 milliseconds 60 at Hertz) and before the ensuing normal fault clearing and isolation procedure implemented by the responsive sectionalizer switches S1.2, S1.3 and S1.6 shown in the ensuing steps 204 through 208a-208b.

Figure 13:
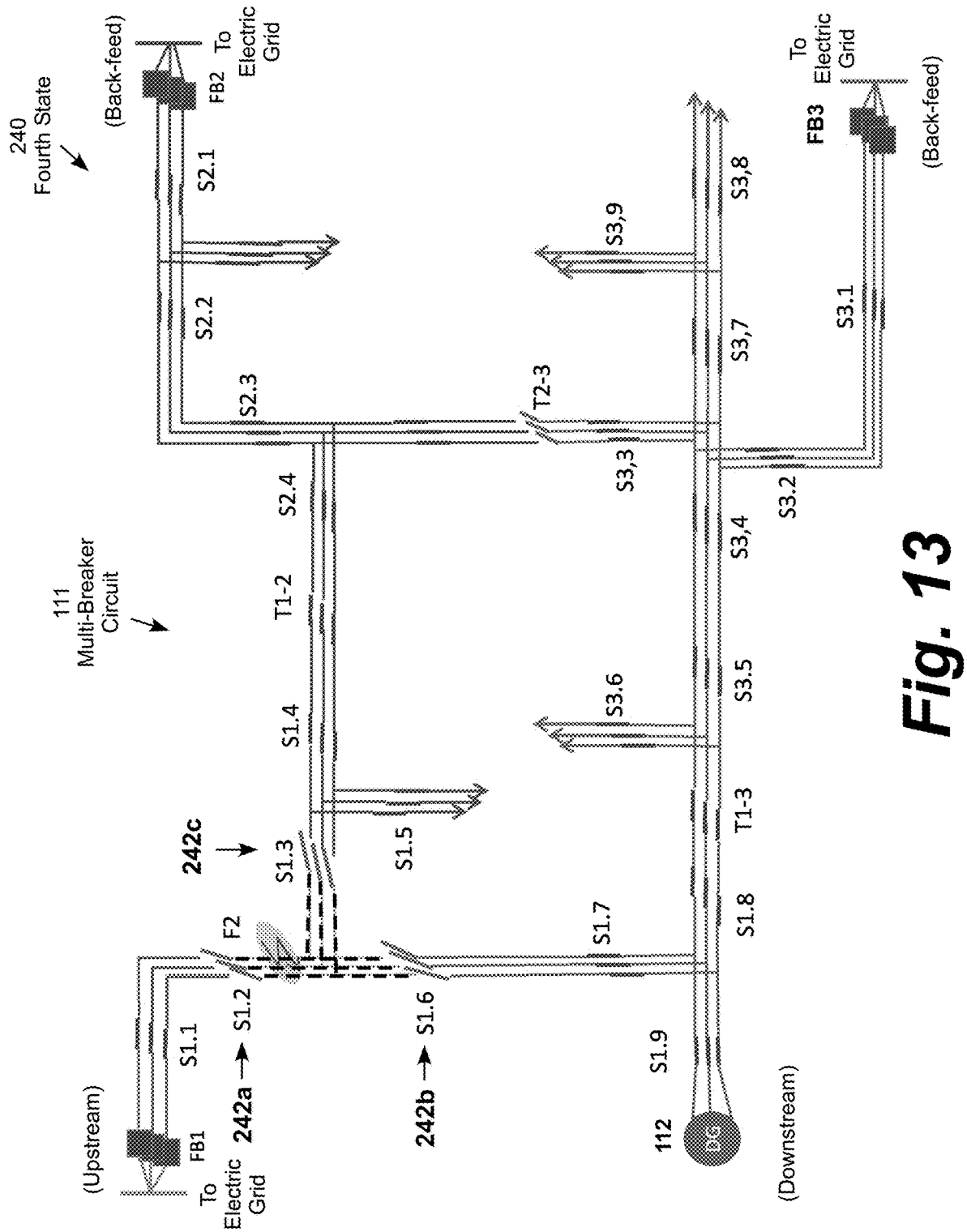
FIG. 13 is a three-phase circuit diagram illustrating a fourth state of the electric circuit during the two-phase fault response.
Figure 14:
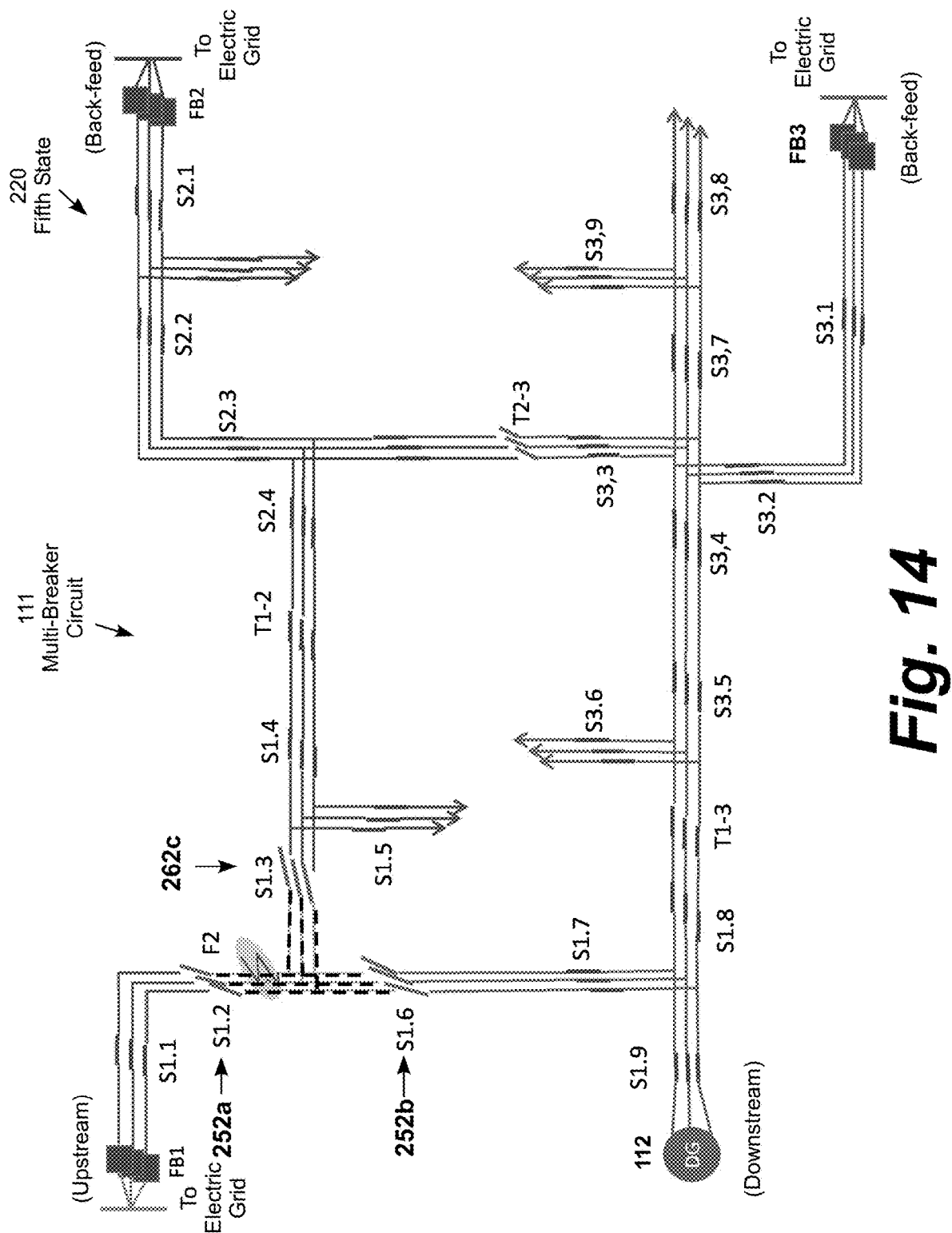
FIG. 14 is a three-phase circuit diagram illustrating a fifth state of the electric circuit during the two-phase fault response.
Figure 15:
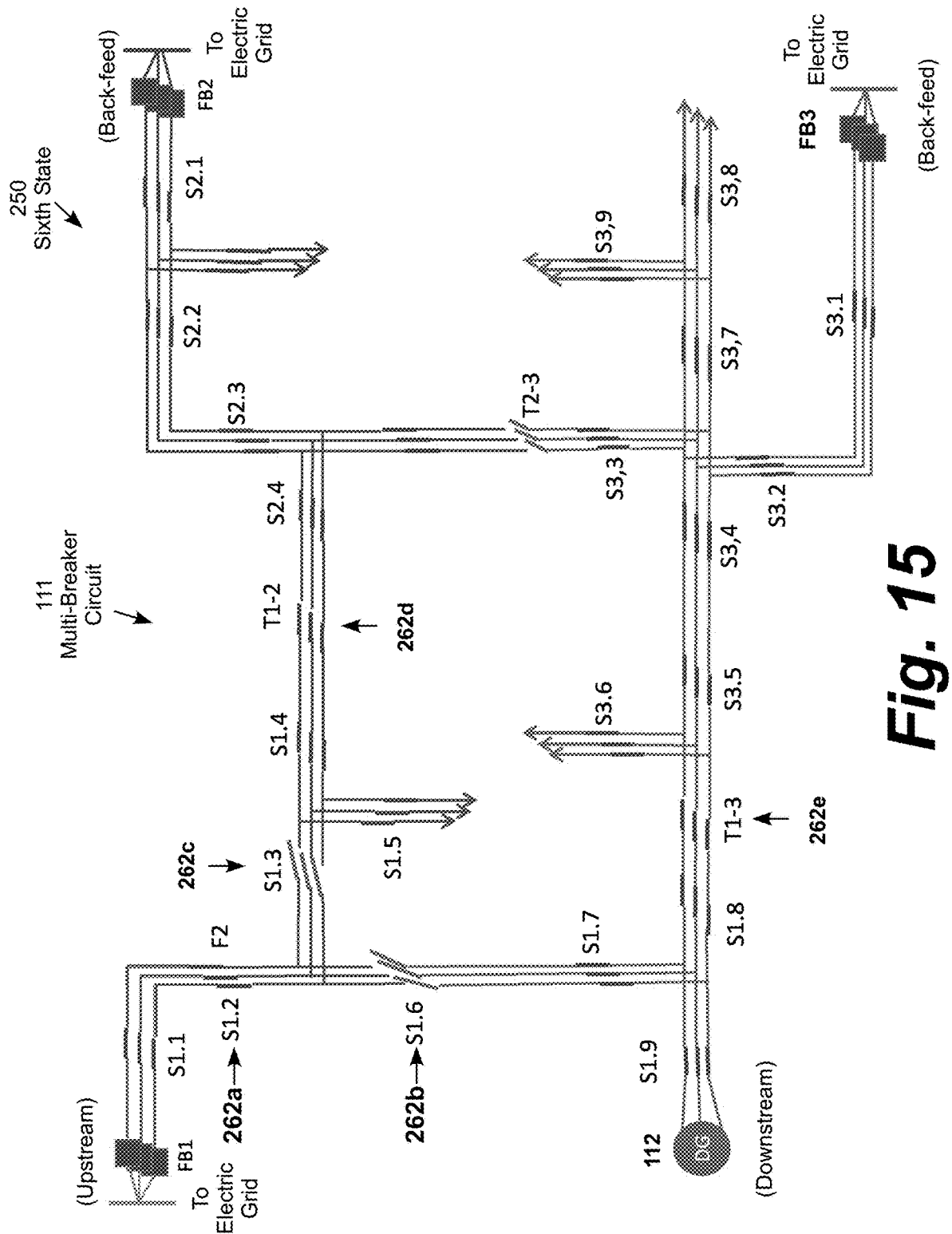
FIG. 15 is a three-phase circuit diagram illustrating a sixth state of the electric circuit during the two-phase fault response.

Step 203 is followed by step 204, in which the upstream responsive sectionalizer switch S1.2 S1.3 and S1.6 initiate their normal isolation procedure by opening the non-faulted phases, which is shown as events 242a, 242b and 242c in FIG. 13 representing the fourth state 240 of the circuit 111. Step 204 is followed by step 205, in which one of the responsive sectionalizer switches continues normal fault clearing and isolation procedure with one to five attempts to close the isolated faulted section separated by a few seconds. In this example, the upstream responsive sectionalizer switch S1.2 is selected to conduct the reclosing and fault clearing. Although the back-feed tie switch is ordinarily closed prior to fully isolating the faulted line section, the timing may be set to trip the non-faulted phases a short time before closing the back-feed tie switch provided that the distributed generators do not lose synchronism with the electric grid and drop offline. This generally requires closing the back-feed tie switch after or within a few cycles, such as 50 milliseconds, before opening the non-faulted phases.

Step 205 is followed by step 206, in which the responsive sectionalizer switches S1.2 S1.3 and S1.6 determine whether the closing attempts were successful. If the reclosing was not successful, the "No" branch is followed from step 206 to step 207, in which all of the responsive sectionalizer switches lock open as shown in FIG. 13 and a service call is initiated for a maintenance crew to physically inspect and repair the fault. If the reclosing was successfully, the "Yes" branch is followed to step 208a or 208b. In step 208a, the faulted line is restored with the upstream sectionalizer switch S1.2 closing and the sectionalizer switches S1.3 and S1.6 remaining open to continue operation as tie switches, and the back-feed tie switches T1-2 and T1-3 remaining closed to continue operation as sectionalizer switches as shown as events 262a, 262b, 262c, 262d, and 262e in FIG. 15. This changes the feeder breaker serving the protected distributed generator DG 112 from the first feeder breaker FB1 switched out by opening the selected sectionalizer switch S1.6 to the third feeder breaker FB3 switched in by closing the back-feed tie switch T1-3. Alternatively, in step 208b, the faulted line is restored by returning the circuit to its pre-fault condition shown in FIG. 10 with the selected sectionalizer switches S1.2, S1.3 and S1.7 remaining closed to continue operation as a sectionalizer switch, and the back-feed tie switches T1-2 and T1-3 remaining open to continue operation as tie switches.

In view of the foregoing, it will be appreciated that present invention provides significant improvements distribution automation system for high voltage electric power transmission and distribution systems. The foregoing relates only to the exemplary embodiments of the present invention, and that numerous changes may be made therein without departing from the spirit and scope of the invention as defined by the following claims.

The invention claimed is:

1. A smart switch for an electric power distribution system comprising a 3-phase physical line switch, a communication device for communicating with other similarly equipped smart switches, and a switch controller comprising a computer storage medium storing non-transitory computer executable instructions that, when executed by the switch controller, cause the smart switch to perform a non-three-phase fault detection, isolation and restoration procedure comprising:
 detecting a non-three-phase fault on a power line connected to the smart switch between a feeder breaker connecting the power line to an electric power grid on an upstream side of the smart switch and a distributed generator connected to the power line on a downstream side of the smart switch;
 determining a faulted phase and a non-faulted phase of the power line;
 determining a faulted side of the smart switch;
 determining a location of the fault on the power line;
 in response to detecting the location of the fault, determining that the smart switch is a responsive sectionalizer switch designated to participate in fault clearing and isolation procedures for the fault;
 in response to determining that the smart switch is a responsive sectionalizer switch, opening a first physical line switch in the faulted phase while leaving a second physical line switch in the non-faulted phase closed;
 determining that the smart switch is selected to perform back-feed operations;
 in response to determining that the smart switch is selected to perform back-feed operations, notifying a selected back-feed tie switch to close to connect the distributed generator to the electric grid through an alternate feeder breaker;
 within 50 milliseconds before or within 50 milliseconds after the back-feed tie switch has closed, opening the second physical line switch while maintaining synchronous back-feed connection of the distributed generator to the electric grid through the alternate feeder breaker;
 after opening the second physical line switch, conducting additional fault clearing and isolation procedures to isolate the non-three-phase fault.

2. The smart switch of claim 1, wherein the additional fault clearing and isolation procedures comprise one to five fault clearing closing attempts of the faulted phase.

3. The smart switch of claim 1, wherein the additional fault clearing and isolation procedures comprise locking out for maintenance repair of the fault if the one to five fault clearing closing attempts of the faulted phase(s) do not successfully clear the fault.

4. The smart switch of claim 1, wherein the additional fault clearing and isolation procedures comprise opening the physical line switches in all phases and operating as a tie switch if the one to five fault clearing closing attempts of the faulted phase successfully clears the fault.

5. The smart switch of claim 1, wherein the selected back-feed tie switch closes to connect the distributed generator to the electric grid through the alternate feeder breaker within a few electric power cycles on the electric power distribution line after determining the faulted phase and the non-faulted phase of the power line.

6. The smart switch of claim 1 wherein determining the location of the non-three-phase fault comprises a peer-to-peer radio communication between the smart switch and one or more of the similarly equipped smart switches.

7. The smart switch of claim 1, wherein determining the location of the non-three-phase fault comprises a differential control scheme.

8. The smart switch of claim 7, wherein the differential protection scheme further comprises peer-to-peer radio communication of power line information limited to identifying the faulted phase(s) and the faulted side of the smart switch.

9. The smart switch of claim 1, wherein the additional fault clearing and isolation procedures comprise isolating all phases of a faulted power line section between a closest upstream switch and a closest downstream switch.

10. The smart switch of claim 1, wherein notifying the selected back-feed tie switch to close to provide looped electric service on the non-faulted phase(s) to the distributed generator further comprises selecting a tie switch to a feeder breaker that meets a criteria selected from the group comprising: least loaded, highest voltage, best power factor, least sensitive loads, and lowest level of distributed generators.

11. An electric power distribution system comprising an electric power line connected between an upstream feeder breaker and a downstream distributed generator, and a smart switch comprising a 3-phase physical line switch in the power line between the feeder breaker and the distributed generator, a communication device for communicating with the other similarly equipped smart switches, and a switch controller comprising a computer storage medium storing non-transitory computer executable instructions that, when executed by the switch controller, cause the smart switch to perform a non-three-phase fault detection, isolation and restoration procedure comprising:
 detecting a non-three-phase fault on the power line;
 determining a faulted phase and a non-faulted phase of the power line;
 determining a faulted side of the smart switch;
 determining a location of the fault on the power line;
 in response to detecting the location of the fault, determining that the smart switch is a responsive sectionalizer switch designated to participate in fault clearing and isolation procedures for the fault;
 in response to determining that the smart switch is a responsive sectionalizer switch, opening a first physical line switch in the faulted phase while leaving a second physical line switch in the non-faulted phase closed;

determining that the smart switch is selected to perform back-feed operations;

in response to determining that the smart switch is selected to perform back-feed operations, notifying a selected back-feed tie switch to close to connect the distributed generator to the electric grid through an alternate feeder breaker;

within 50 milliseconds before or 50 within milliseconds after the back-feed tie switch has closed, opening the second physical line switch while maintaining synchronous back-feed connection of the distributed generator to the electric grid through the alternate feeder breaker;

after opening the second physical line switch, conducting additional fault clearing and isolation procedures to isolate the non-three-phase fault.

12. The electric power distribution system of claim 11, wherein the additional fault clearing and isolation procedures comprise one to five fault clearing reclosing attempts of the faulted feeder section.

13. The electric power distribution system of claim 11, wherein the additional fault clearing and isolation procedures comprise locking out for maintenance repair of the fault if the one to five fault reclosing attempts of the faulted feeder section do not successfully clear the fault.

14. The electric power distribution system of claim 11, wherein the additional fault clearing and isolation procedures comprise opening the physical line switches in all phases and operating as a tie switch if the one to five reclosing attempts of the faulted feeder section successfully clears the fault.

15. The electric power distribution system of claim 11, wherein the selected back-feed tie switch closes to connect the distributed generator to the electric grid through the alternate feeder breaker within a few electric power cycles on the electric power distribution line after determining the faulted phase and the non-faulted phase of the power line.

16. The electric power distribution system of claim 11, wherein determining the location of the non-three-phase fault comprises peer-to-peer radio communication between the smart switch and one or more of the similarly equipped smart switches.

17. The electric power distribution system of claim 11, wherein determining the location of the non-three-phase fault further comprises a differential control scheme.

18. The electric power distribution system of claim 17, wherein the differential protection scheme further comprises peer-to-peer radio communication of power line information limited to identifying the faulted phase and the faulted side of the smart switch.

19. The electric power distribution system of claim 11, wherein the additional fault clearing and isolation procedures comprise isolating all phases of a faulted power line section between a closest upstream switch and a closest downstream switch.

20. The electric power distribution system of claim 11, wherein notifying a selected back-feed tie switch to close to provide looped electric service on the non-faulted phase to the distributed generator further comprises selecting a tie switch to a feeder breaker that meets a criteria selected from the group comprising: least loaded, highest voltage, best power factor, least sensitive loads, and lowest level of distributed generators.

* * * * *